(12) United States Patent
Sato et al.

(10) Patent No.: US 8,732,210 B2
(45) Date of Patent: *May 20, 2014

(54) DATA RECORDING SYSTEM, DATA RECORDING METHOD AND DATA RECORDING PROGRAM

(75) Inventors: Masafumi Sato, Osaka (JP); Kazuya Fujimura, Kanagawa (JP); Hiroyuki Kamezawa, Osaka (JP); Tomoo Nakagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 13 days.

This patent is subject to a terminal disclaimer.

(21) Appl. No.: 13/160,098

(22) Filed: Jun. 14, 2011

(65) Prior Publication Data

US 2011/0246529 A1    Oct. 6, 2011

Related U.S. Application Data

(63) Continuation of application No. 12/064,755, filed as application No. PCT/JP2006/314092 on Jul. 14, 2006, now Pat. No. 8,028,004.

(30) Foreign Application Priority Data

Aug. 26, 2005  (JP) ................................. 2005-246370
Aug. 26, 2005  (JP) ................................. 2005-246371

(51) Int. Cl.
*G06F 7/00*      (2006.01)
*G06F 17/30*     (2006.01)

(52) U.S. Cl.
USPC ........................................................ 707/802

(58) Field of Classification Search
USPC .................. 707/802, 804, 809, 811
See application file for complete search history.

(56) References Cited

U.S. PATENT DOCUMENTS 5,027,214 A * 6/1991 Fujimori .................... 348/231.7
5,740,445 A    4/1998 Okuda
(Continued)

FOREIGN PATENT DOCUMENTS

EP    1 094 463    4/2001
EP    1 469 472    10/2004
(Continued)

OTHER PUBLICATIONS

Design Rule for JEIDA, Design rule for Camera File system, DCF Version 1.0 (JEIDA-49/2/1998), Japan.

*Primary Examiner* — Rehana Perveen
*Assistant Examiner* — Mark E Hershley
(74) *Attorney, Agent, or Firm* — Hamre, Schumann, Mueller & Larson, P.C.

(57)    ABSTRACT

A data recording system 1 includes: a file generating part 3 for dividing digital data so as to generate a plurality of data files and recording the plurality of the data files sequentially into a recording medium 5; a management file judging part 6 for determining one management file for recording management information of the plurality of the data files; and a management information generating part 4 for recording the management information of the plurality of the data files into the determined management file. The management file judging part 6 determines the management file such that the number of the data files managed by the management file does not exceed a maximum data file number L (L is a natural number) that can be managed by the management file. Thereby, it is possible to record the plurality of the data files that are divided from the digital stream data and are recorded, such that the management of the plurality of the data files is easy.

19 Claims, 30 Drawing Sheets

(56) References Cited

U.S. PATENT DOCUMENTS

| | | | |
|---|---|---|---|
| 5,974,503 A * | 10/1999 | Venkatesh et al. | 711/114 |
| 6,154,813 A * | 11/2000 | Martin et al. | 711/133 |
| 6,504,993 B1 | 1/2003 | Matsumoto | |
| 6,574,377 B1 * | 6/2003 | Cahill et al. | 382/305 |
| 6,856,348 B1 | 2/2005 | Okada | |
| 7,139,767 B1 * | 11/2006 | Taylor et al. | 1/1 |
| 7,598,988 B2 * | 10/2009 | Hagiwara et al. | 348/231.3 |
| 7,768,558 B1 * | 8/2010 | Schinner et al. | 348/231.99 |
| 2002/0078073 A1 | 6/2002 | Kudo | |
| 2002/0085476 A1 * | 7/2002 | Samari-Kermani | 369/124.07 |
| 2002/0112112 A1 * | 8/2002 | Yoshida | 711/1 |
| 2003/0065585 A1 * | 4/2003 | Satomi et al. | 705/26 |
| 2003/0095195 A1 | 5/2003 | Iwauchi | |
| 2003/0103055 A1 * | 6/2003 | DaSilva | 345/536 |
| 2003/0217240 A1 * | 11/2003 | Satomi et al. | 711/161 |
| 2004/0146272 A1 * | 7/2004 | Kessel et al. | 386/46 |
| 2004/0223730 A1 * | 11/2004 | Sugimoto | 386/46 |
| 2004/0267821 A1 | 12/2004 | Kiyama et al. | |
| 2004/0268043 A1 * | 12/2004 | Hoshizawa et al. | 711/117 |
| 2005/0147385 A1 | 7/2005 | Takahashi et al. | |
| 2006/0018632 A1 * | 1/2006 | Dorsh | 386/117 |
| 2006/0034585 A1 * | 2/2006 | Terada | 386/52 |
| 2006/0090049 A1 * | 4/2006 | Saika | 711/162 |
| 2006/0149558 A1 * | 7/2006 | Kahn et al. | 704/278 |
| 2006/0291805 A1 * | 12/2006 | Mita | 386/95 |

FOREIGN PATENT DOCUMENTS

| | | | | |
|---|---|---|---|---|
| EP | 1 675 124 | 6/2006 | | |
| JP | 4-186447 | 7/1992 | | |
| JP | 7-262059 | 10/1995 | | |
| JP | 11-232792 | 8/1999 | | |
| JP | 2000-236503 | 8/2000 | | |
| JP | 2000236503 A * | 8/2000 | | H04N 5/907 |
| JP | 2001-84167 | 3/2001 | | |
| JP | 2001084167 A * | 3/2001 | | G06F 12/00 |
| JP | 2001-101050 | 4/2001 | | |
| JP | 2001101050 A * | 4/2001 | | G06F 12/00 |
| JP | 2003-131698 | 5/2003 | | |
| JP | 2004-229070 | 8/2004 | | |
| JP | 2005-027346 | 1/2005 | | |
| JP | 2005-196496 | 7/2005 | | |
| JP | 2005-204156 | 7/2005 | | |
| WO | 03/046912 | 6/2003 | | |
| WO | 2005/034126 | 4/2005 | | |

* cited by examiner

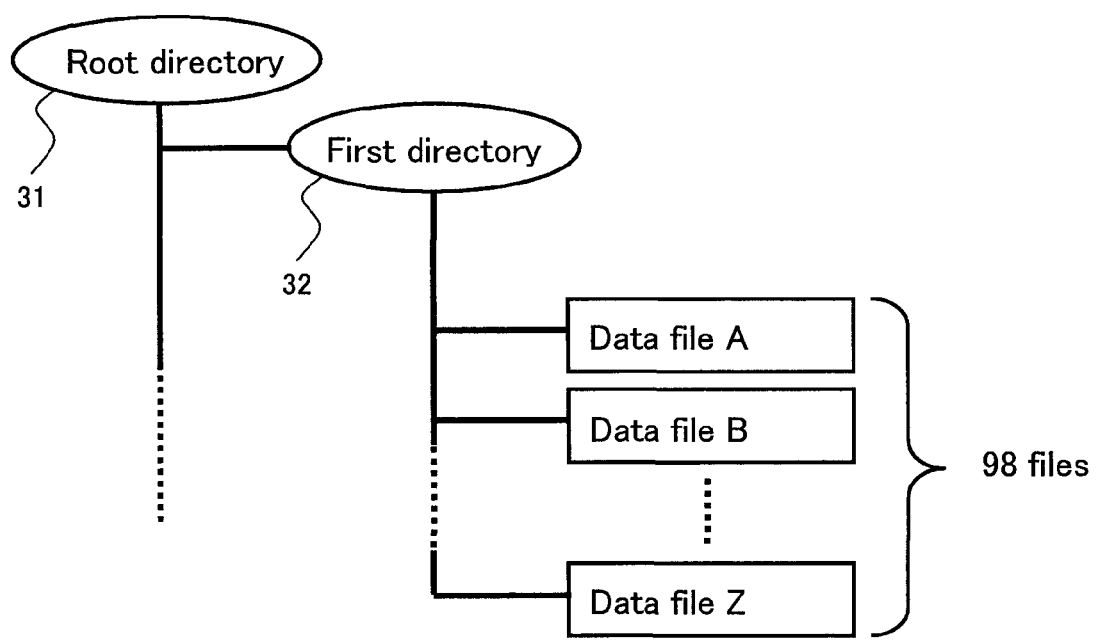
F I G. 16

DATA RECORDING SYSTEM, DATA RECORDING METHOD AND DATA RECORDING PROGRAM

TECHNICAL FIELD

The present invention relates to a data recording system and a data recording program for recording digital data as a data file into a recording medium.

BACKGROUND ART

Recently, an apparatus that records digital stream data such as video images and audio as a file into a recording medium such as an optical disk and a semiconductor memory has been used commonly. According the increase of a capacity of the recording medium, the number of files that can be recorded also is increased. Also, the kinds of files to be recorded have been varied. As a result, it has been difficult to sort all of the files to be recorded into the recording medium and manage them. Therefore, a method for sorting the various kinds of files based on the respective directories so as to record and manage them is suggested (see, for example, Patent Document 1 and Non-patent Document 1).

Patent Document 1 suggests a audio recording reproducing apparatus that can sort audio messages with various recording modes or data formats so as to manage them. This audio recording reproducing apparatus prepares a plurality of directories according to the recording modes or the data formats in advance. The audio messages are recorded into a directory that is selected according to an environment at the time of the recording, among the plurality of the directories.

Moreover, a DCF (Design Rule for Camera File System) described in Non-patent Document 1 is a standard that is formed for the purpose of exchanging image files and files relating to images between digital still cameras and relevant apparatuses easily. The DCF defines a specification for using the digital still cameras and the relevant apparatuses to record and reproduce the files relating to the images.

A directory structure of the DCF described in Non-patent Document 1 will be described below. FIG. 29 is a view showing a structure of the directory of the DCF. In FIG. 29, an ellipse represents the directory and a rectangle represents a file. Directly under a root directory 91, a DCIM directory 92 (DCF image directory) is recorded. The DCIM is an abbreviation of "Digital Camera IMages". Directly under this DCIM directory 92, DCF directories such as a first DCF directory 93 and a second DCF directory 94 are recorded. Into the first DCF directory 93 and the second DCF directory 94, DCF objects are recorded, respectively. The DCF object is, for example, a DCF master file (image file) or the like. In the directory structure shown in FIG. 29, the DCF objects that are recorded in the first DCF directory 93 and the second DCF directory 94 directly under the DCIM directory 92 are managed according to the DCF. Moreover, the maximum number of DCF objects that can be recorded into the first DCF directory 93 and the second DCF directory 94 respectively are determined to be 999. This aims to facilitate the management of the DCF objects.

By the way, an increase of a capacity of the recording medium leads not only to an increase of the number of files but also to an increase of a file size to be recorded by a user. Whereas, a maximum file size of one file is determined, for example, by the limitation and the like of a file system (FAT 32 or the like) that is adopted by a computer. This does not result in the unlimited increase of the size of one file to be recorded into the recording medium. Accordingly, for example, in the case where digital video image audio stream data with a file size that is larger than a predetermined maximum file size is recorded into the large-capacity recording medium, sequential digital video image audio stream data is divided and recorded into a plurality of data files.

For managing the plurality of the thus recorded data files, the plurality of the data files that are divided from the sequential digital video image audio stream data preferably are recorded into the same directory. However, for example, in a directory structure defining a maximum data file number that can be recorded in the directory, such as the directory structure defined by the DCF, the plurality of the data files cannot be recorded into the same directory in some cases. This state will be explained below with reference to the drawings.

FIG. 30 is a view showing an example of a case where the divided data files are recorded into the directory defining the maximum data file number that can be recorded. In the directory structure shown in FIG. 30, a first directory 32 and a second directory 51 are under a root directory 31. Maximum data file numbers that can be recorded in the first directory 32 and the second directory 51 are 99, respectively.

The first directory 32 records a first management file 33 that records information for managing data files in the first directory 32. The second directory 51 records a second management file 52. The first management file includes, for example, a first management table that is information for managing an order to store the data files recorded in the first directory 32, that is, a recording order. In the first management table, information that shows data files recorded in the first directory 32 is recorded in their recording order. Similarly, the second management file 52 also includes a second management table.

In the example shown in FIG. 30, in the case where the data file number that is already recorded in the first directory 32 is 98, a first data file 24 that is generated by dividing a digital stream data 21 is recorded. In this state, since the data file number recorded in the first directory 32 becomes the predetermined maximum data file number of 99, no more data files can be recorded into the first directory 32.

Thus, remaining data files that are generated by dividing the digital stream data 21, i.e. a second data file 25 and a third data file 26, are recorded into the second directory 51. The second management table records information showing the second data file 25 and the third data file 26 sequentially.

As described above, the three data files 24, 25 and 26 that form one sequential digital stream data 21 are divided and recorded into two directories of the first directory 32 and the second directory 51.

Patent document 1: JP 2003-131698 A

Non-patent document 1: Design Rule for JEIDA, Design rule for Camera File system, DCF Version 1.0 (JEIDA-49-2-1998), Japan Electronics and Information Technology Industries Association, Published in December, 1998, p. 8-20.

DISCLOSURE OF INVENTION

Problem to be Solved by the Invention

As described above, in the conventional recording method, in the case where one sequential digital stream data is divided and recorded into a plurality of data files, the plurality of the divided data files may not be recorded into the same directory but be divided and recorded into a plurality of directories separately. In this case, when a reproducing apparatus or a user handles the plurality of the divided data files as one sequential digital stream data, the plurality of the directories are required to be referred. As a result, the management of the data files becomes difficult, which leads to poor convenience.

Moreover, in a system that manages the recording order of the data files and their relationships in the directory according to the management files that are provided corresponding to the respective directories, in the case where the plurality of the divided data files are recorded into the plurality of the directories separately, the management files also become necessary to have information relating to the data files that are recorded in the directories other than their corresponding directories.

For example, in the case where one sequential digital stream data is divided into the plurality of the data files so as to be recorded into the plurality of the directories, it becomes impossible to reproduce the plurality of the divided data files sequentially, unless the management files of the respective directories have information relating to the data files other than the directories that are managed by themselves.

If the management files also have the information relating to the data files recorded in the plurality of the directories, structures of the management files become complicated. As a result, the management of the data files becomes difficult, which leads to the poor convenience.

In the light of the problems described above, the present invention aims to provide a data recording system and a data recording program that can record digital data so as to facilitate management of plurality of recorded data files, in the case where the digital data is divided and recorded into the plurality of the data files.

Means for Solving Problem

The data recording system of the present invention is a data recording system for dividing digital data into a plurality of data files and recording the plurality of the data files into a recording medium, the data recording system including: a file generating part for dividing the digital data so as to generate the plurality of the data files and recording the plurality of the data files sequentially into the recording medium; a management file judging part for determining one management file that stores management information for managing the plurality of the data files; and a management information generating part for adding the management information including information that shows a recording order of the plurality of the data files into the management file determined by the management file judging part, wherein the management file judging part determines the management file for storing the management information such that, when adding the management information of the plurality of the data files into the management file, the number of the data files managed by the management file does not exceed a maximum data file number L (L is a natural number) that is the number of data files that can be managed by the management file.

The management file judging part determines the management file whose number does not exceed the maximum data file number L that is the number of data files that can be managed even if recording the plural number of data files generated by dividing the digital data, as the management file for storing the management information of the plurality of the data files. The management information generating part adds the management information of the plurality of the data files into the management file that is determined by the management file judging part. Thus, the plurality of the data files are managed by the one management file that is determined by the management file judging part. As a result, the management information of the plurality of the data files generated by dividing the digital data is not stored into a plurality of the management files separately. Thereby, the management of the plurality of the data files becomes easy. For example, processing of reading out the plurality of the data files by using the management information of the management file becomes simple.

In the data recording system of the present invention, it is preferable that, when the number of data files managed by the management file reaches the maximum data file number L when management information of first to Nth (N is a natural number) data files among the plurality of the data files are added into the management file, the management file judging part changes the management file for storing the management information into another management file that is different from the management file, and the management information generating part moves the management information of the first to Nth data files into the another management file, and stores management information of (N+1)th and greater data files into the another management file.

In the data recording system of the present invention, when the file generating part storing the management information of the plurality of the divided data files into the management file, the maximum data file number L that can be managed by one management file is predetermined. Thus, on the way of adding the management information of the plurality of the data files that are generated by dividing the digital data into the management file sequentially, the number of data files managed by the management file may reach the maximum data file number L.

In such a case, the management file judging part changes the management file for storing the management information into another management file that is different from the management file. Then, the management information generating part adds management information of remaining data files into the another management file, and also adds the management information that is recorded into the original management file into the another management file. Thus, the management information of the plurality of the data files that are generated by dividing the digital data are not stored into two management files separately, but is stored into the same management file. That is, the plurality of the data files that are divided from the same digital data surely are managed by the one management file. Thus, a structure of the management file becomes simple. Also, processing of reading out the plurality of the data files by using the information of the management file becomes easy. That is, the management of the plurality of the data files becomes simple.

In the data recording system of the present invention, it is preferable that the management file is provided so as to correspond to each directory on the recording medium, each of the management files includes management information of a data file in each corresponding directory, the file generating part records the plurality of the data files into the directories on the recording medium, the management information generating part adds the management information of the data file recorded in the directory into the management file that is provided so as to correspond to the directory, in the case where the number of data files recorded into the directory reaches the maximum data file number L that is the number of data files that can be recorded in the directory when first to Nth (N is a natural number) data files among the plurality of the data files are recorded into the directory, the management file judging part changes the management file for storing the management information into another management file corresponding to another directory that is different from the directory, and the file generating part moves the first to Nth data files into the another directory and records (N+1)th and greater data files into the another directory.

When the file generating part records the plurality of the divided data files into the directory, the maximum data file number that can be recorded into the directory is predetermined, for example, in the case of the DCF. In such a case, when a part of the plurality of the data files that are generated by dividing the digital data is recorded into the directory, the number of the files recorded into the directory may reach the maximum file number that can be recorded into the directory.

As described above, in the case where no more data file can be recorded into the directory while the file generating part records the plurality of the data files into the directory, the file generating part records remaining data files into the another directory, and moves the data files that are recorded in the original directory into the another directory, according to the above-described structure. Thus, the plurality of the data files that are divided from the same digital data surely are recorded into the one directory.

Moreover, the management file judging part changes to add the management information based on the management file into the another management file that corresponds to the another directory. The management information generating part adds the management information of the first to Nth data files and the management information of the (N+1)th or greater data files into the another management file. Thereby, the plurality of the data files are managed as being recorded in the one directory by the management file. Thus, the structure of the management file becomes simple. Moreover, the processing of reading out the plurality of the data files by using the information of the management files becomes simple. That is, the management of the plurality of the data files becomes simple.

Moreover, since the plurality of the data files that are divided from the same digital data surely are recorded in the one directory, the management information of the management files can be information with respect only to the data files in the directory. That is, the information that is effective only in the directory corresponding to the management files can be included in the management information. For example, data such as a flag showing whether a certain data file and the data file recorded immediately before the certain data file are divided from the same digital data or not can be included in the management file.

In the data recording system of the present invention, it is preferable that the management information includes records containing information relating to the data files to be managed, each of the records relating to each of the data files, the management information generating part adds a plurality of the records showing the plurality of the data files in an order of recording the plurality of the data files as the management information into the management file, in the case where the number of data files managed by the management file reaches the maximum data file number L when the management information of the first to Nth (N is a natural number) data files are added into the management file, the management file judging part changes the management file for storing the management information into the another management file that is different from the management file, and the management information generating part reserve area of N records for the another management file, adds the records that respectively correspond to the (N+1)th and greater data files into the management file sequentially when the (N+1)th and greater data files are recorded into the recording medium, and adds the records that correspond to the first to Nth data files into the reserve area during or after the recording.

Thereby, the record that shows the plurality of the data files including the first to Nth data files and the (N+1)th or greater data files are arranged in the recording order so as to be recorded into a table of the management file that corresponds to the another directory. Thus, the management file can manage the order of the data files in the corresponding directory.

Moreover, since the plurality of the data files that are divided from the same digital data surely are recorded into the one directory, the management file may manage the order of only the data files in the corresponding directory. Thereby, the structure of the management file becomes simple.

In the data recording system of the present invention, it is preferable that the management file judging part determines a newly formed management file as the another management file.

The data recording system of the present invention preferably further includes a file number obtaining part for obtaining the number of data files managed by at least one management file among the management files that already are recorded in the recording medium, wherein the management file judging part determines the management file for storing the management information by comparing a sum of the number of the plurality of the recorded data files and the number of data files obtained by the file number obtaining part with the maximum data file number L after recording the plurality of the data files by the file generating part.

The management file judging part determines the management file for storing the management information by comparing the sum of the number of the plurality of the recorded data files and the number of the data files obtained by the file number obtaining part with the maximum data file number L. Thereby, the management file judging part can determine, as the management file for storing the management information, the management file whose number of the managed data files does not exceed the maximum data file number L even if adding the management information of the plurality of the data files. Thus, even if the digital data is divided into the plurality of the data files, the plurality of the data files are managed not by two or more management files but by the one management file. As a result, the management of the files generated by dividing the digital data becomes easier.

In the data recording system of the present invention, it is preferable that the management file is provided so as to correspond to each of the directories on the recording medium and includes the management information of the data files in the respective corresponding directories, and the file generating part includes a dividing part for dividing the digital data into a plurality of data files and records the files into a temporary turnout area temporarily, the data recording system further including: a file number obtaining part for obtaining the number of files that are recorded in at least one directory among the directories on the recording medium; and a directory selecting part for selecting the recording directory by comparing a sum of the number of files obtained by the file number obtaining part and the number of data files recorded into the temporary turnout area by the file generating part with a maximum file number that is the number of data files that can be recorded in the directory, wherein the file generating part moves the plurality of data files recorded in the temporary turnout area by the dividing part into the recording directory that is selected by the directory selecting part, and the management file judging part determines a management file corresponding to the recording directory as the management file for managing the plurality of the data files.

The directory selecting part selects the recording directory by comparing the sum of the number of the files obtained by the file number obtaining part and the number of the data files saved in the temporary turnout area by the dividing part with the maximum file number, and thus can select, as the recording directory, the directory that can record the files saved in the temporary turnout area. That is, the directory that can record one or more data files generated by dividing the digital data is selected as the recording directory. Thus, even if the digital data is divided into the plurality of the data files, the plurality of the data files are not divided and recorded into two or more directories, but are recorded into the one directory. Moreover, the management file judging part determines the management file for storing the management information of the plurality of the data files as the management file that corresponds to the recording directory, so that the management information of the plurality of the data files are stored into the one management file. As a result, the management of the files generated by dividing the digital data becomes easier.

Incidentally, the temporary turnout area may be a part of an area on the recording medium, or may be a part of an area of a recording means (for example, a memory of a data recording system or the like) that is provided separately from the recording medium.

In the data recording system of the present invention, it is preferable that the management file judging part determines, as the management file for storing the management information, a management file in which sum of the number of the files obtained by the file number obtaining part and the number of the plurality of the data files is equal to or less than the maximum data file number L.

Thereby, the management file judging part can determine the one management file that can manage the plurality of the data files as the management file for recording the management information.

In the data recording system of the present invention, it is preferable that, in the case where the management file in which sum of the number of the files obtained by the file number obtaining part and the number of the plurality of the data files is equal to or less than the maximum data file number L is not present, the management file judging part newly forms a management file and determines the formed management file as the management file for storing the management information.

Thereby, the management file judging part can determine the one management file that can manage the plurality of the data files as the management file for storing the management information.

In the data recording system of the present invention, it is preferable that, in the case where a limitation value M of a file size of one file is predetermined in the data recording system, the data recording system further includes: a file number obtaining part for obtaining the number of data files that are managed by at least one management file among the management files recorded in the recording medium; a remaining amount detecting part for detecting a remaining amount K that can be recorded in the recording medium; a maximum file number calculating part for calculating, based on the remaining amount K and the limitation value M of the file size, a maximum value J of the data file number that can be taken in the case of dividing the digital data into a plurality of data files and recording the plurality of the data files into the remaining amount K, wherein the management file judging part determines the management file for storing the management information based on the number of the data files managed by the management file that is obtained by the file number obtaining part and the maximum value J of the data files.

According to such a structure, even before the file generating part starts the recording, the maximum file number calculating part can calculate the maximum data file number J that can be generated by dividing the digital data in one recording, from the remaining amount K of the recording medium detected by the remaining amount detecting part.

Thereby, the management file judging part can determine the management file for storing the management information of the generated data files, according to the number of the data files managed by the management file on the recording medium, which is obtained by the file number obtaining part, and the maximum data file number J that can be generated by the one recording.

In the data recording system of the present invention, it is preferable that, in the case where the management file is provided so as to correspond to each of the directories on the recording medium, and the maximum data file number L that is the number of data files that can be managed by the management file is equal to the maximum data file number that is the number of data files that can be recorded into each corresponding directory, the data recording system further includes: a recording directory selecting part for determining a directory corresponding to the management file that is determined by the management file judging part as the directory for recording the plurality of the data files, and the file generating part records the plurality of the data files into the directory that is selected by the recording directory selecting part.

Thus, the recording directory selecting part can select the directory that can record the data file as the recording directory. Thereby, the data files generated by dividing the digital data can be recorded into the one directory.

In the data recording system of the present invention, it is preferable that the management file judging part determines, as the management file for storing the management information, a management file in which sum of the number of the data files managed by the management file that is obtained by the file number obtaining part and the maximum value J of the data files is equal to or less than the maximum data file number L.

Thereby, the management file judging part can determine the management file that can store the management information of the data files generated by dividing the digital data.

In the data recording system of the present invention, it is preferable that, in the case where the management file in which sum of the number of the files obtained by the file number obtaining part and the maximum value J of the data files is equal to or less than the maximum data file number L is not present, the management file judging part newly forms a management file, and determines the formed management file as the management file for storing the management information.

Thereby, the management file judging part can determine the management file that can record the management information of the data files generated by dividing the digital data.

In the data recording system of the present invention, it is preferable that, in the case where a maximum file size that can be taken by one file is predetermined and a size of the digital data exceeds the maximum file size, the file generating part divides the digital data into a plurality of files having a size that is equal to or less than the maximum file size.

The photographing equipment of the present invention is a photographing apparatus including: an imaging part for picking up an incident optical image; a signal processing part for generating video image digital data from the optical image that is picked up by the imaging part; a file generating part for dividing the digital data that is generated by the signal processing part so as to generate a plurality of data files and recording the plurality of the data files sequentially into the recording medium; a management file judging part for determining one management file that stores management information for managing the plurality of data files; and a management information generating part for adding the management information that includes information showing a recording order of the plurality of the data files into the management file determined by the management file judging part, wherein the management file judging part determines a management file for storing the management information such that a data file number that is the number of data files that are managed by the management file in the case of adding the management information of the plurality of the data files into the management file does not exceed the maximum data file number L (L is a natural number) that is the number of data files that can be managed by the management file.

The data recording program of the present invention is a data recording program that allows a computer to execute processing for dividing digital data into a plurality of data files and recording the plurality of the data files into a recording medium, the data recording program allowing the computer to execute: file generating processing for dividing the digital data so as to generate a plurality of the data files and recording the plurality of the data files sequentially into the recording medium; management file judgment processing for determining one management file that stores the management information for managing the plurality of the data files; and management information generation processing for adding the management information including information showing a recording order of the plurality of the data files into the management file determined by the management file judging part, wherein the management file judgment processing is processing for determining a management file for storing the management information such that, in the case of adding the management information of the plurality of the data files into the management file, the number of the data files managed by the management file does not exceed a maximum data file number L (L is a natural number) that is the number of data files that can be managed by the management file.

In the data recording program of the present invention, it is preferable that, in the case where the number of data files managed by the management file reaches the maximum data file number L when management information of first to Nth (N is a natural number) data files among the plurality of the data files is added into the management file, the management file that stores the management information in the management file judgment processing is changed into another management file that is different from the management file, the management information of the first to Nth data files are moved into the another management file, and management information of (N+1)th and greater data files are added into the another management file in the management information generation processing.

The data recording program of the present invention preferably is processing for allowing the computer further to execute file number obtaining processing for obtaining the number of the data files managed by at least one management file among the management files that are already recorded in the recording medium, wherein the management file judgment processing is processing for determining the management file for storing the management information by comparing a sum of the number of the plurality of the recorded data files and the number of the data files obtained in the file number obtaining processing with the maximum data file number L after recording the plurality of the data files in the file generation processing.

In the case where a limitation value M of a file size of one file is predetermined in the recording medium, the data recording program of the present invention preferably allows the computer further to execute: file number obtaining processing for obtaining the number of the data files managed by at least one management file among the management files recorded in the recording medium; remaining amount detecting processing for detecting a remaining amount K that can be recorded into the recording medium; maximum file number calculation processing for calculating, based on the remaining amount K and the limitation value M of the file size, a maximum value J of the number of the data files that can be taken in the case of dividing the digital data into the plurality of the data files and recording the plurality of the data files into the remaining amount K, wherein the management file judgment processing is processing for determining the management file for storing the management information based on the number of the data files managed by the management file that is obtained by the file number obtaining part and the maximum value J of the data files.

The data recording method of the present invention is a data recording method in which a computer divides digital data into a plurality of data files and recording the plurality of the data files into a recording medium, the data recording method including: a file generating step for dividing the digital data so as to generate the plurality of the data files and recording the plurality of the data files sequentially into the recording medium; a management file judging step for determining one management file for storing management information for managing the plurality of the data files; and a management information generating step for adding the management information including information that shows a recording order of the plurality of the data files into the management file determined by the management file judging step, wherein the management file judging step includes determining the management file for storing the management information such that, in the case of adding the management information of the plurality of the data files into the management file, the number of the data files managed by the management file does not exceed a maximum data file number L (L is a natural number) that is the number of data files that can be managed by the management file.

In the data recording method of the present invention, it is preferable that, in the case where the number of data files managed by the management file reaches the maximum data file number L when management information of first to Nth (N is a natural number) data files among the plurality of the data files are added into the management file, the management file judging step includes changing the management file for storing the management information into another management file that is different from the management file, and the management information generating step includes moving the management information of the first to Nth data files into the another management file, and adding management information of (N+1)th and greater data files into the another management file.

The data recording method of the present invention preferably further includes a file number obtaining step for obtaining the number of data files managed by at least one management file among the management files that are already recorded in the recording medium, and the management file judging step including determining the management file for storing the management information by comparing a sum of the number of the plurality of the recorded data files and the number of data files obtained in the file number obtaining step with the maximum data file number L after recording the plurality of the data files in the file generating step.

In the recording medium, in the case where a limitation value M of a file size of one file is predetermined in the recording medium, the data recording method of the present invention preferably includes: a file number obtaining step for obtaining the number of the data files that are managed by at least one management file among the management files recorded in the recording medium; a remaining amount detecting step for detecting a remaining amount K that can be recorded into the recording medium; and a maximum file number calculating step for calculating, based on the remaining amount K and the limitation value M of the file size, a maximum value J of the data file number that can be taken in the case of dividing the digital data into a plurality of data files and recording the plurality of the data files into the remaining amount K, wherein the management file judging step is a step for determining the management file for storing the management information based on the number of the data files managed by the management file that is obtained by the file number obtaining step and the maximum value J of the data files.

Effects of the Invention

The present invention can provide the data recording system and the data recording program that is capable of recording so as to facilitate the management of the plurality of the recorded data files, in the case of dividing the digital data into the plurality of the data files and recording them.

BRIEF DESCRIPTION OF DRAWINGS

FIG. 16 is a view showing an example of a directory structure of a recording medium 107 for recording data files.

Figure 1:
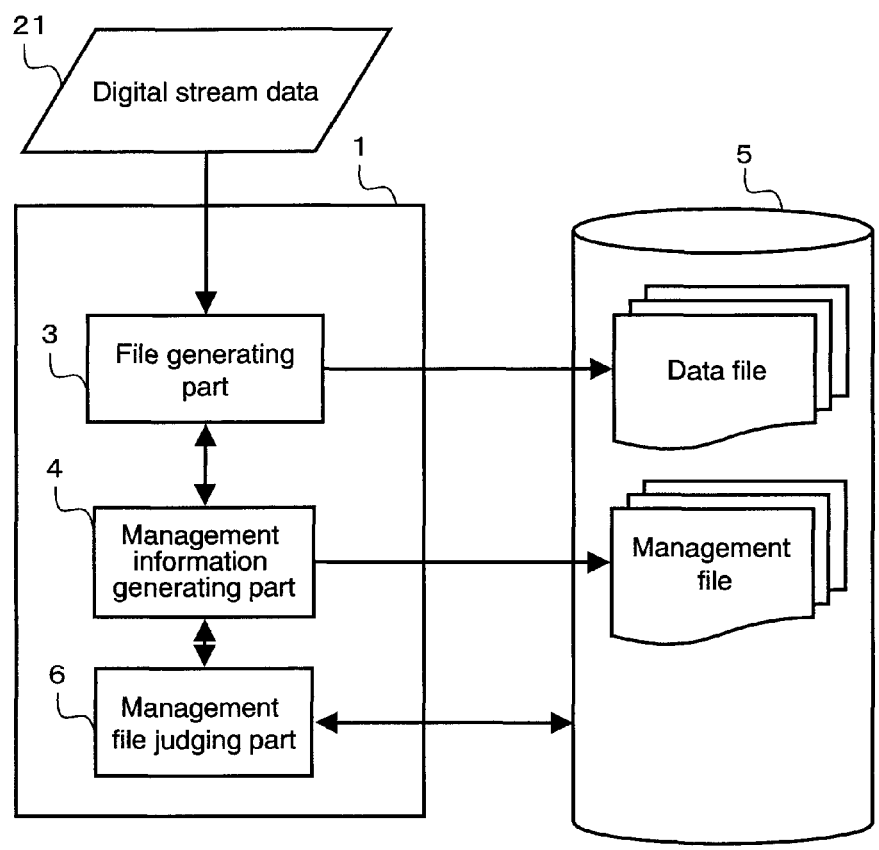
FIG. 1 is a functional block diagram showing a structure of a data recording system of the present embodiment.

EXPLANATION OF REFERENCE CODES 1, 1a, 1b, 1c, 1d data recording system
3 file generating part
4 management information generating part
5, 17, 107 recording medium
6, 6a, 6d management file judging part
7, 7d file number obtaining part
9 maximum file number calculating part
11 dividing part
12 file generating part
13 recording information detecting part
15 maximum file number calculating part
21, 301, 405 digital stream data
22 starting point
23 ending point
24 first data file
25 second data file
26 third data file
31, 91, 501 root directory
32 first directory
33 first management file
41 management-file directory
42 data-file directory
51 second directory
52 second management file
101 data input terminal
102 dividing part
104 file generating part
105 directory selecting part
106 file number obtaining part
108 temporary turnout area
302 recording starting instruction receiving point
303 recording ending instruction receiving point
504, 507 directory management information file

DESCRIPTION OF THE INVENTION

Embodiments of the present invention will be described below with reference to the drawings.

Embodiment 1

FIG. 1 is a functional block diagram showing a structure of a data recording system of the present embodiment. As shown in FIG. 1, the data recording system 1 is provided with a file generating part 3, a management information generating part 4 and a management file judging part 6. The data recording system 1 is connected with a recording medium 5, and is in a state of being able to record data into the recording medium 5 and read out the data from the recording medium 5.

The file generating part 3 divides digital stream data 21 so as to generate a plurality of data files. The plurality of the data files generated by the file generating part 3 are recorded into the recording medium 5. The data files are recorded into a predetermined directory among a plurality of directories on the recording medium 5.

The management file judging part 6 determines a management file for storing management information of the plurality of the data files generated by the file generating part 3, and instructs it to the management information generating part 4. In the case of storing the management information of the plurality of the data files into the management file, the management file judging part 6 determines a management file for storing the management information such that the number of data files managed by the management file does not exceed a maximum data file number L (L is a natural number) that can be managed by the management file.

The management information generating part 4 generates management information for managing the plurality of the data files generated by the file generating part 3, and adds them into the management file determined by the management file judging part 6. The management information includes information showing an order of the plurality of the data files. Moreover, the management information also may include information showing that each of the data files are generated by dividing the digital stream data 21, information showing that presence or absence of the data file managed by the management file and the like.

In the present embodiment, the management file is provided so as to correspond to each of the directories on the recording medium 5, and each of the files stores the management information of the data files in the corresponding directory. Moreover, in this embodiment, an upper limit of the number of the data files that can be recorded in each of the directories is equal to the maximum data file number L that can be managed by the management file.

The data recording system 1 also can be integrated into equipment provided with a function for recording digital data, such as a digital still camera, a video camera, a mobile phone, a PDA, a music player, a video recorder (a DVD recorder, a HDD recorder and a TV set with a recording function), for example. The data recording system 1 may be provided in a general computer such as a personal computer.

The data recording system 1 can be mounted as a system for recording data into the recording medium by receiving an order from an higher apparatus that controls writing and read-out of data with respect to the recording medium, for example, in equipment or a general computer (hereinafter, called the equipment) that is provided with the function for recording the digital data. Incidentally, the higher apparatus and the data recording system 1 may be provided with the same hardware in the equipment, or may be provided with another hardware.

Functions of the file generating part 3, the management information generating part 4 and the management file judging part 6 may be realized, for example, by a CPU executing a predetermined program.

The recording medium 5 is a recording medium such as, for example, a semiconductor memory, an optical disk, a hard disk and the like. Examples of these recording media include a recording medium provided by the equipment, a recording medium that can be attached/detached with respect to the equipment, a recording medium that is connected with the equipment and the like. Examples of the recording medium 5 include an attachable/detachable memory card, a semiconductor memory or a hard disk integrated in a computer, a DVD and the like.

Examples of the digital stream data 21 handled by the data recording system 1 include moving image data showing a video image and audio, music data, game data and the like. The data that can be handled by the data recording system 1 is not limited to the digital stream data 21, and all digital data is included.

Figure 2:
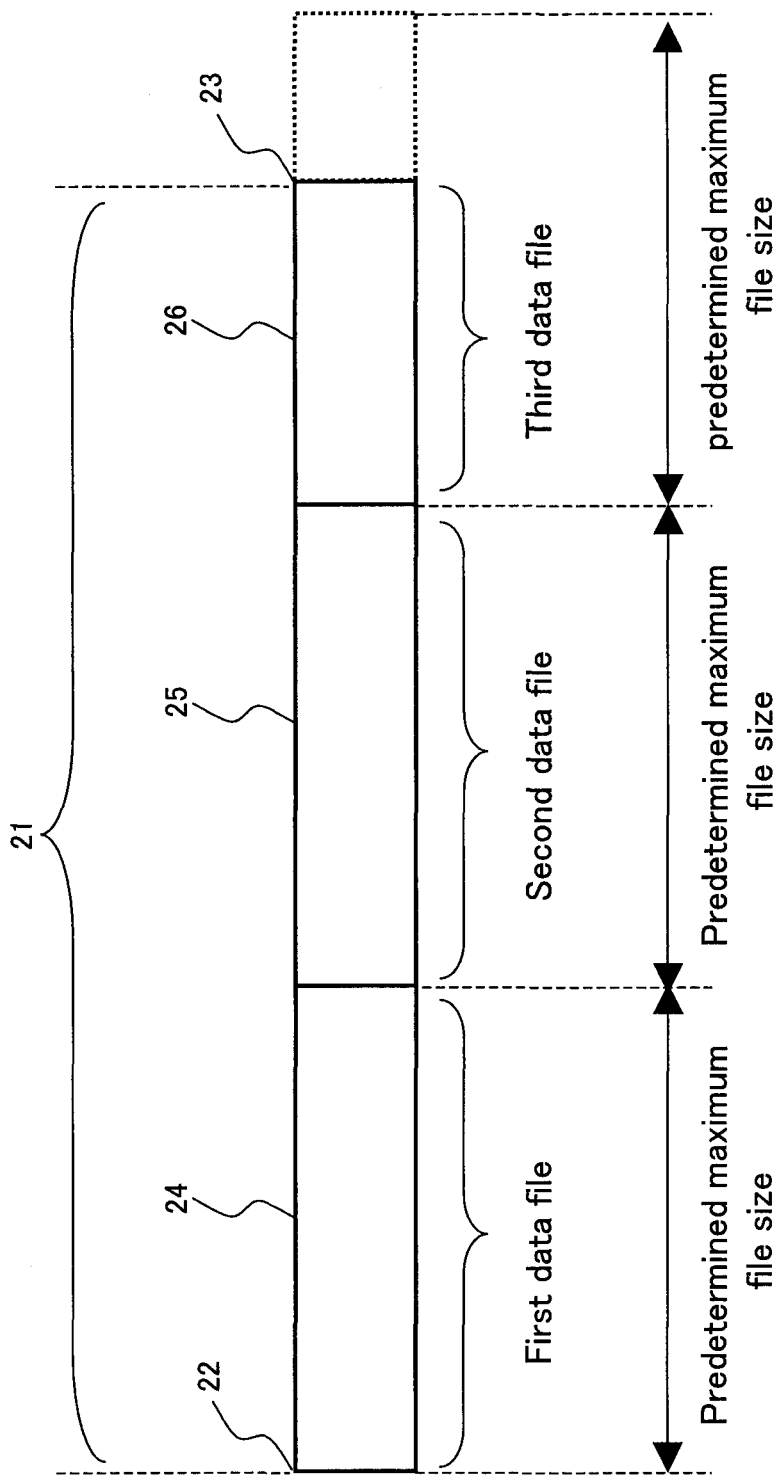
FIG. 2 is a schematic view showing a state of dividing digital stream data into data files.

Here, an example where the digital stream data 21 is divided into the plurality of the data files by the file generating part 3 will be explained. FIG. 2 is a schematic view showing a state of dividing the digital stream data 21 into the data files.

In the example of FIG. 2, the file generating part 3 reads a series of digital stream data 21 from its starting point 22 to its ending point 23 sequentially so as to generate the data files. The file generating part 3 starts the reading from the starting point 22, and records the read data as a first data file 24. After some time, a size of the first data file 24 reaches a predetermined maximum file size. At this time, the file generating part 3 cannot record the data into the first data file 24 any more, and thus records sequent data into a second data file 25. Incidentally, the predetermined maximum file size is determined by a limitation or the like of a file system (FAT32 or the like) adopted by a computer, for example.

After some time, a size of the second data file 25 also reaches the predetermined maximum file size, so that the file generating part 3 records sequent data into a third data file 26. Then, the reading is ended at the ending point 23. In the example shown in FIG. 2, before the third data file 26 reaches the predetermined maximum file size, the digital stream data 21 is ended. As described above, the one sequential digital stream data 21 is divided into the three data files 24, 25, 26.

Figure 3:
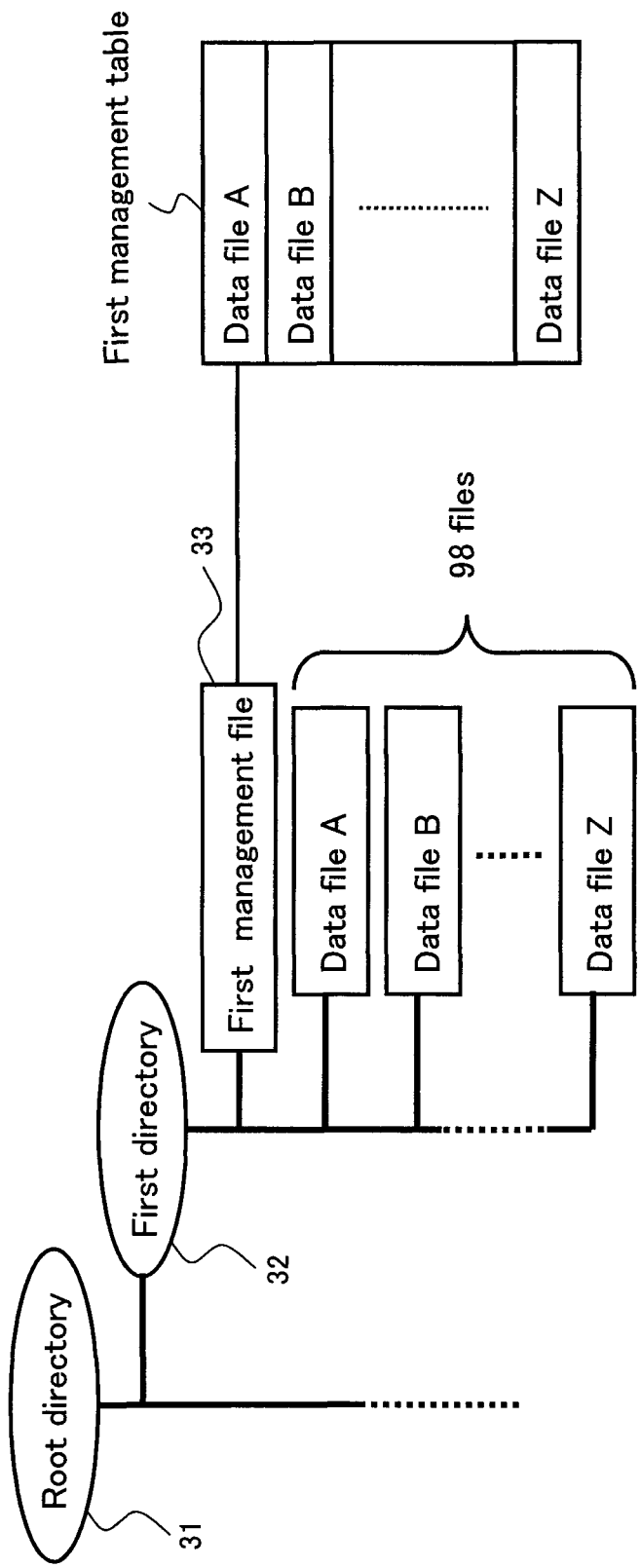
FIG. 3 is a view showing an example of a directory structure of a recording medium for recording the data files.

FIG. 3 is a view showing an example of a directory structure of the recording medium 5 for recording the data files. In FIG. 3, an ellipse represents the directory, and a rectangle represents the file. Under a root directory 31, there is a first directory 32 for recording the data file. The predetermined maximum data file number that can be recorded in this first directory 32 is 99. In the example shown in FIG. 3, the 98 data files are already recorded in the first directory 32.

Moreover, in the first directory 32, a first management file 33 is recorded. The first management file 33 includes a recording order of the data files recorded in the first directory 32, that is, a first management table that is information for managing the recording order. In the first management table, for example, records that represents information showing the individual data files recorded in the first directory 32 are arranged in the recording order and are recorded. Thus, the order of recording the data files to be recorded in the first directory 32 is managed as a record order in the first management table. Incidentally, the records are not necessarily recorded as being arranged in physically continuous memory areas, and may be recorded continuously in logic.

The records to be recorded in the first management table in the first management file 33 are used for determining a reproducing order in each of the directories, for example. Moreover, for example, information showing a relationship between a certain data file and a data file recorded immediately before the certain data file may be included in the record. As one example, a flag or the like showing whether the respective data files in the directory are to be reproduced continuously or not, that is, whether the respective data files form one continuous digital stream data or not, also may be included in the record that is to be recorded into the first management file 33 or the second management file 52.

Incidentally, the number of the data files that can be managed by one management file is limited. For example, in the present embodiment, since the maximum data file number that can be recorded into the first directory 32 is 99, a maximum data file number that can be managed by the first management file 33 also is 99. That is, the maximum number of the records of the data files that can be recorded into the first management file 33 is 99.

For example, when a reproducing apparatus reads the plurality of the data files that are recorded in the directory, the reproducing apparatus reads the data files in the record order of the management table by referring to the management file, whereby the data files can be reproduced in a correct order conforming to the recording order. Moreover, when the reproducing apparatus reads the plurality of the data files in the directory sequentially, the reproducing apparatus can determine whether to reproduce a next data file to be read subsequently by combining with the data file that is read immediately before the next data file or not, according to the flag in each of the data files included in the management file.

Moreover, a structure of the data stored in the management file is not limited to the structure described above. The structure of the data recorded into the management file may be any structure, as long as it includes the information for managing the order of the plurality of the data files in the directory. As the structure of the data, besides the above-described table format, for example, a linked list format (the next data file is stated in each data file), an order designation format (a number representing the order in the directory is stated in each data file) or the like may be used.

Moreover, the management file may include, besides the information for managing the order, for example, an attribution of the directory, a general attribution of each of the data files and the like.

Figure 4:
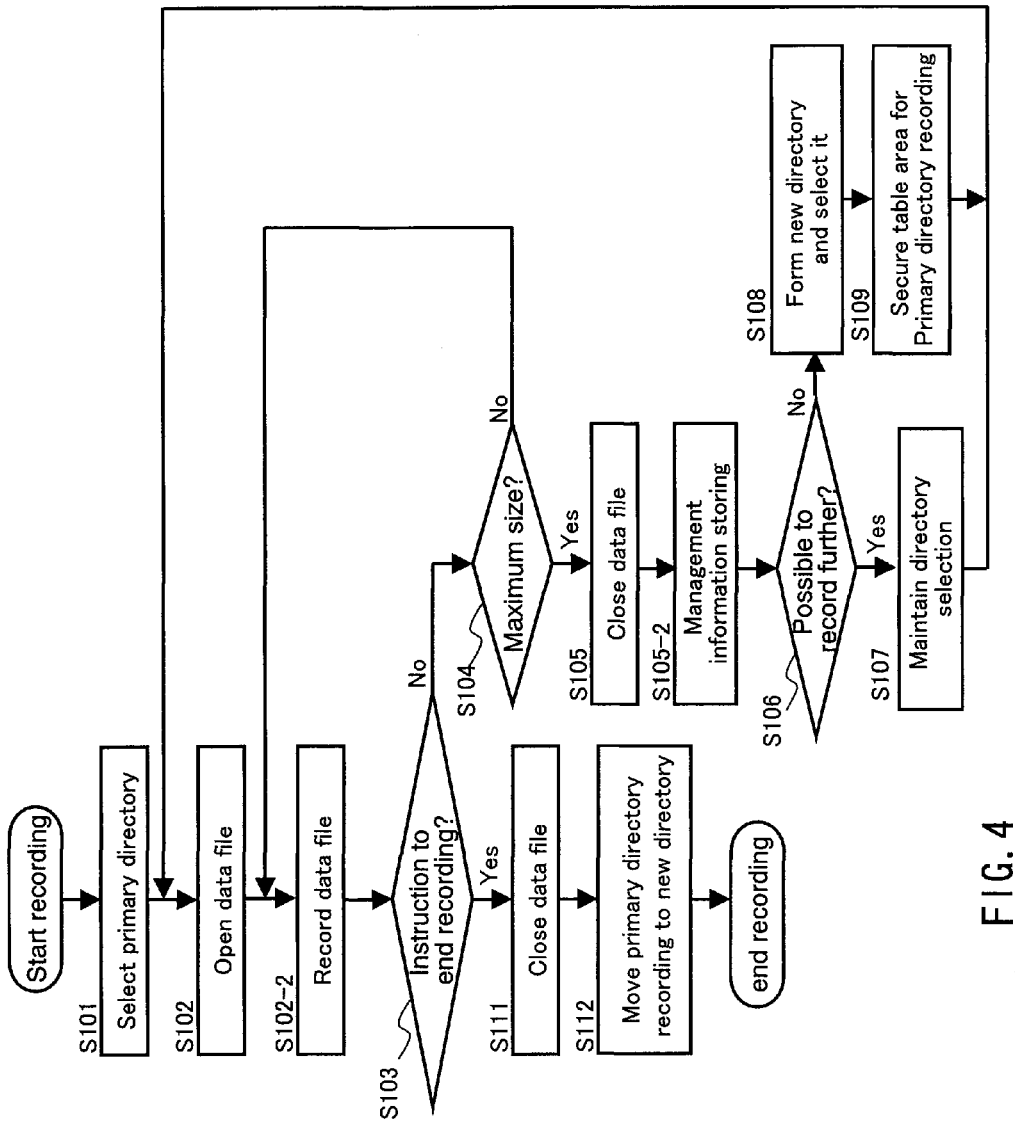
FIG. 4 is a flow chart showing an example of an operation of a data recording system.

Next, an example of an operation of the data recording system 1 when the data recording system 1 divides and records the digital stream data 21 will be explained. FIG. 4 is a flow chart showing an example of the operation of the data recording system. The operation shown in FIG. 4 is an example of the operation of the data recording system 1 when the file generating part 3 reads and records the digital stream data 21 shown in FIG. 2 from its starting point 22 to its ending point 23.

Firstly, the file generating part 3 selects a directory to record the data file primarily (Step S101). The file generating part 3 can select a directory whose recorded file number does not reach the predetermined maximum data file number, for example.

In the present embodiment, a case where the file generating part 3 selects the first directory 32 among the directories shown in FIG. 3 as the directory that primarily records the data file will be exemplified for the explanation. Since the number of the data files recorded in the first directory 32 is 98, which is less than the predetermined maximum data file number of 99, the file generating part 3 can select the first directory 32 as the directory for primarily recording the data file.

The file generating part 3 opens the first data file (Step S102). The file generating part 3 newly forms the first data file in the first directory, and opens it so as to make a writable state. The file generating part 3 records the digital stream data 21 sequentially from the starting point 22 into the opened first data file (Step S102-2). When receiving a recording ending instruction from the above-described equipment or the like, the file generating part 3 closes the data file and ends the recording (Step S111).

Without the recording ending instruction, the file generating part 3 continues recording the digital stream data 21 until a size of the recorded data reaches the predetermined maximum file size (No in Step S104). For example, since a recording error is generated in the recording processing after the size of the recorded data reaches the predetermined maximum file size, in the case of detecting the recording error, the file generating part 3 can judge that the size of the recorded data reaches the predetermined maximum file size. That is, while there is no recording ending instruction from the equipment or the like (No in Step S103), and the size of the recorded data does not reach the predetermined maximum file size, the file generating part 3 continues recording the digital stream data 21 into the first data file 24 (Step S102-2).

When the size of the first data file 24 reaches the predetermined maximum file size (Yes in Step S104), the file generating part 3 closes the first data file 24 (Step S105). The management information generating part 4 adds the record that represents the first data file 24 into the first management table (Step S105-2). The file generating part 3 checks whether a further data file can be recorded into the first directory 32 or not (Step S106).

For example, the file generating part 3 obtains the file number existing in the first directory 32, and judges whether the file number is less than the predetermined maximum data file number that can be recorded in the first directory 32 or not. In the case where the file number of the first directory 32 is less than the predetermined maximum data file number, it is judged that a further data file can be recorded in the first directory 32. Alternatively, the file generating part 3 may obtain the record number of the first management table of the first management file 33 as the file number of the first directory 32.

Figure 5:
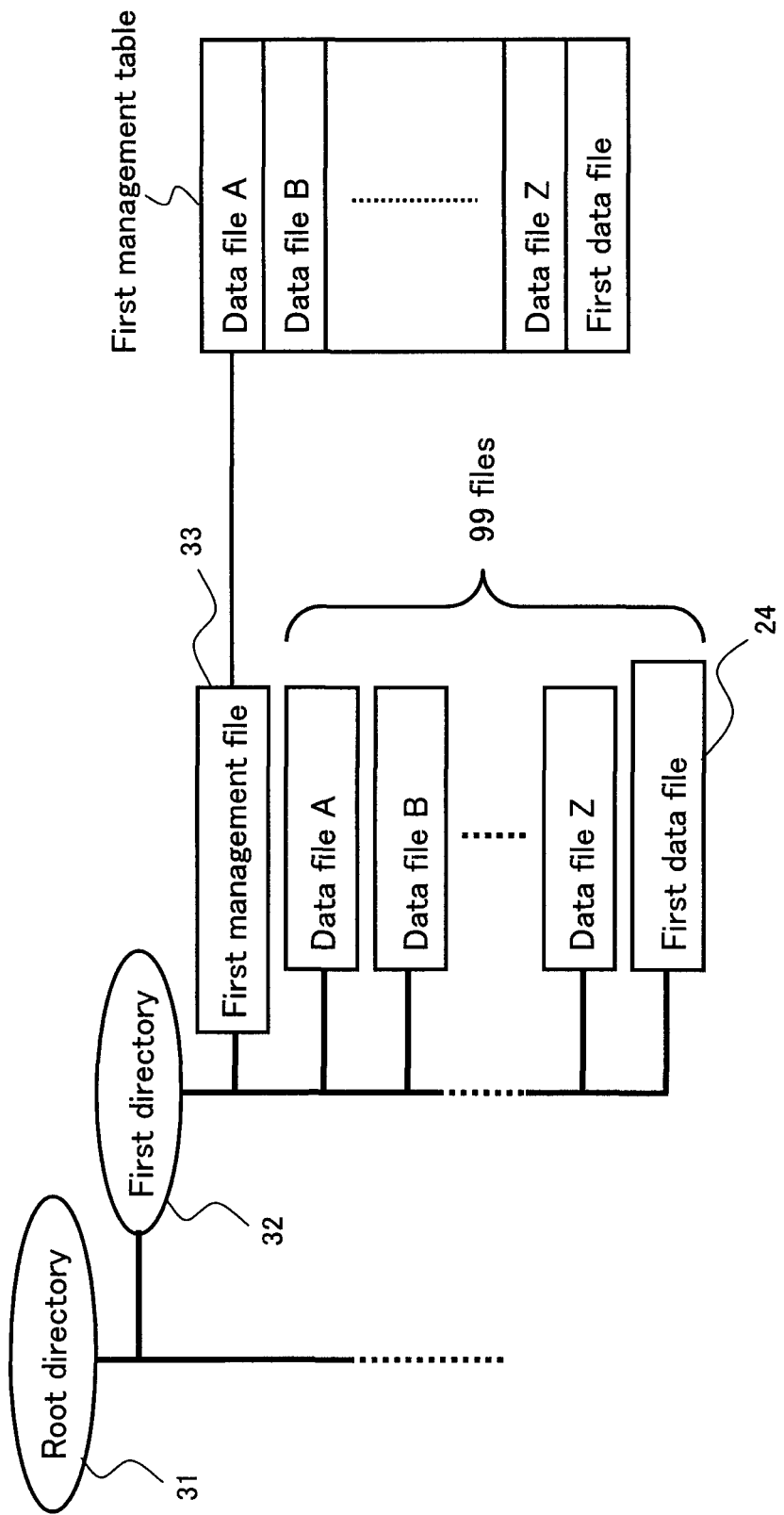
FIG. 5 is a view showing a directory structure after recording a first data file into a first directory.

FIG. 5 is a view showing a directory structure after recording the first data file 24 into the first directory 32. As shown in FIG. 5, at the time when recoding the first data file 24 into the first directory 32, the data file number recorded in the first directory 32 becomes the predetermined maximum data file number of 99. No more data file can be recorded into the first directory 32. In such a case, the file generating part 3 judges that no more data file can be recorded into the first directory 32 (No in Step S106).

Since no more data file can be recorded into the first directory 32, the file generating part 3 newly forms a second directory 51, and selects it for recording data files after that (Step S108). The management file judging part 6 generates a second management file for managing the data files to be recorded into the newly formed second directory, and records them into the second directory 51. The management file judging part 6 notifies, to the management information generating part 4, that the second management file is a management file for storing the management information of the data files.

The management information generating part 4 reserves a table area that is sufficient for storing the records the data files 24 recorded in the first directory 32, in the second management table in the second management file 52 (Step S109). That is, the management information generating part 4 reserves the table area for recording the records of the data files that are generated from the digital stream data 21 and are recorded in the first directory 32 selected primarily.

The file generating part 3 opens the second data file 25 in order to record sequent digital stream data 21 (Step S102). The file generating part 3 reads the digital stream data 21 and records it into the second data file 25 sequentially similarly to the recording of the first data file 24. While there is no recording ending instruction (No in Step S103), and the size of the recorded data does not reach the predetermined maximum file size (No in Step S104), the digital stream data 21 is recorded into the second data file 25.

In the example of the present embodiment, as shown in FIG. 2, while the file generating part 3 records the digital stream data 21 into the second data file 25, and before reaching the ending point 23, the size of the second data file 25 reaches the predetermined maximum file size. When the size of the second data file 25 reaches the predetermined maximum file size (Yes in Step S104), the file generating part 3 closes the second data file 25 (Step S105). The second data file 25 is recorded into the second directory 51. The management information generating part 4 adds the records representing the second data file 25 into the second management table. The file generating part 3 checks whether a further data file can be recorded into the second directory 51 or not (Step S106).

Figure 6:
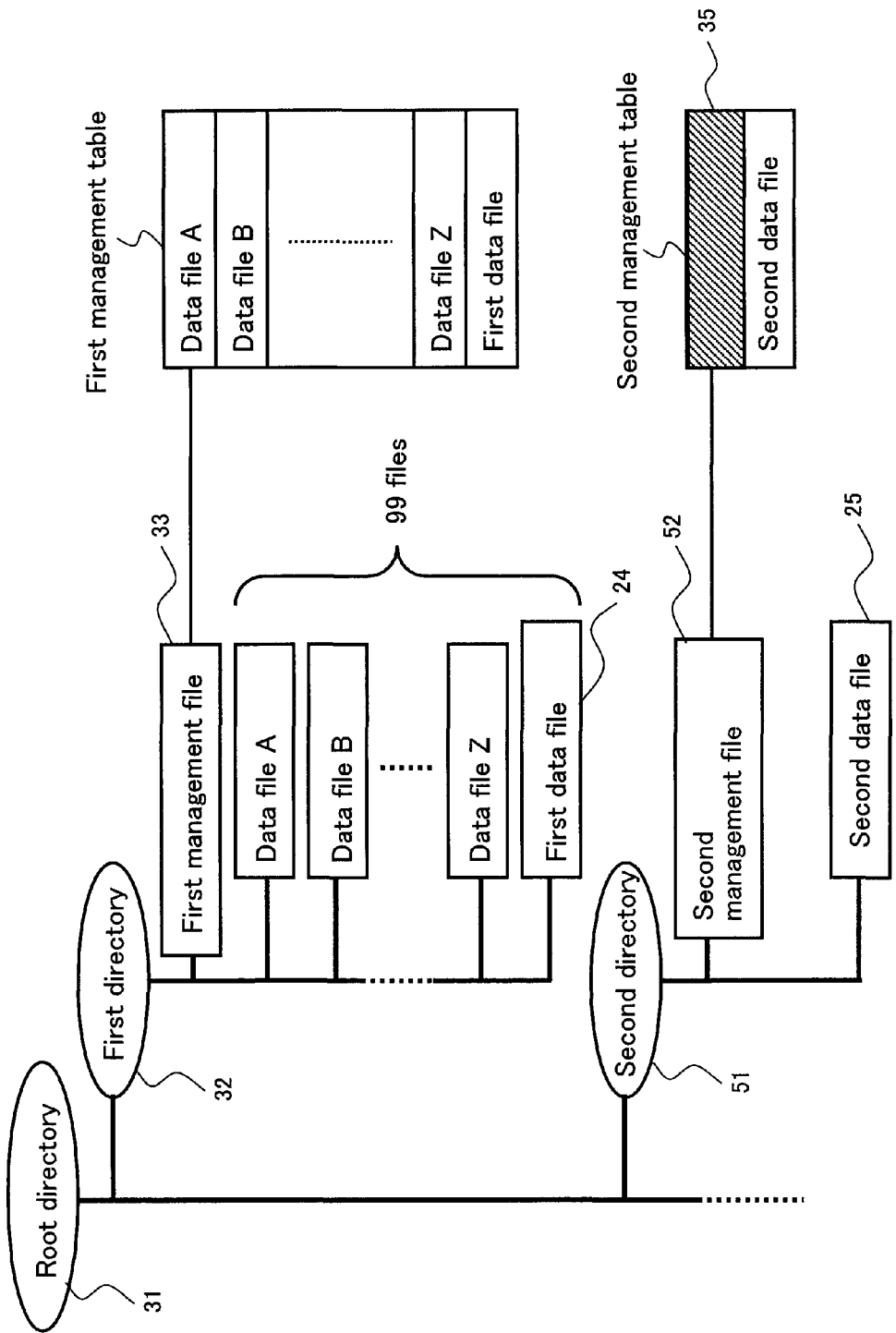
FIG. 6 is a view showing a directory structure in the case where a second directory and a second management file are formed, and a second data file is recorded.

FIG. 6 is a view showing a directory structure in the case where the second directory 51 and the second management file 52 are formed, and the second data file 25 is recorded. An area 35 represented by oblique lines in the second management table of the second management file 52 is the area that is reserved for the records of the first data file 24. In the example shown in FIG. 6, the number of the data files recorded in the second directory 51 is 1, and does not reach the maximum data file number of 99. Thus, further data files can be recorded into the second directory 51. In such a case, the file generating part 3 judges that a further data file can be recorded into the second directory 51 (Yes in Step S106). As a result, the file generating part 3 maintains the selection of the second directory 51 continuously (Step S107). Also, the management file judging part 6 maintains the selection of the second management file 52.

The file generating part 3 opens a third data file 26 (Step S102). The file generating part 3 reads the digital stream data 21 sequent to the data that is recorded in the second data file, and records it into the third data file 26 sequentially. In the example of the present embodiment, as shown in FIG. 2, before the data recorded in the third data file 26 reaches the predetermined maximum size file, the data to be read by the file generating part 3 reaches the ending point 23. When the data to be read by the file generating part 3 reaches the ending point 23, the recording ending instruction is generated (Yes in Step S103). When the recording ending instruction is generated, the file generating part 3 closes the third data file 26 (Step S111). The management information generating part 4 adds the record representing the third data file 26 into the second management table.

The file generating part 3 moves the data file for forming the digital stream data 21 recorded in the first directory 32, that is, the first data file 24 into the second directory 51. As described above, the file generating part 3 moves the data files recorded in the primarily selected directory (first directory) into the newly generated directory (second directory 51), whereby it becomes possible to record all of the plurality of the data files that are divided from the digital stream data 21 into the new directory.

Moreover, the management information generating part 4 moves the record representing the first data file 24 that is stored in the first management table among the first management file 33 into the area 35 that is reserved for the second management table in the second management file 52.

Figure 7:
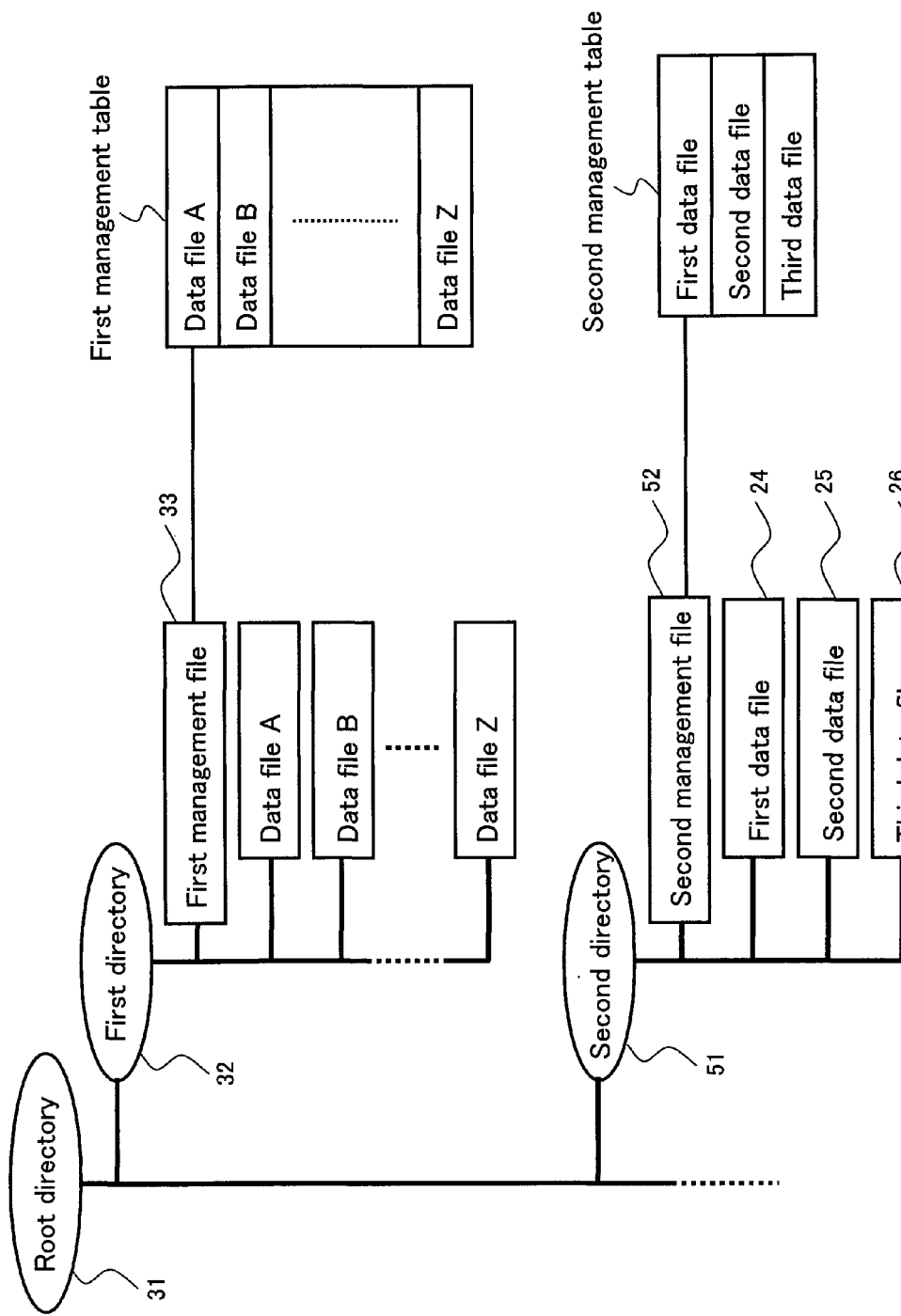
FIG. 7 is a view showing a directory structure after ending recording of digital stream data.

FIG. 7 is a view showing a directory structure after ending the recording of digital stream data 21. As shown in FIG. 7, the first data file 24, the second data file 25 and the third data file 26 are recorded into the second directory 51. Moreover, the records representing the first data file 24, the second data file 25 and the third data file 26 are recorded in this order into the second management table in the second management file 52. As described above, the three data files forming the one sequential digital stream data 21 are recorded into one directory that is the second directory 51.

Herein, the second management table in the second management file 52 is used for determining a reproducing order in the directory, for example. Also, the second management file 52 includes, for example, a flag or the like that shows whether the respective data files should be reproduced sequentially or not, that is, whether the respective data files form the one sequential digital stream data or not.

As described above, in Embodiment 1, in the case of dividing and recording the one sequential digital stream data into the plurality of the data files, the plurality of the divided data files can be recorded into the same directory. Thus, the management file can include information that is effective only in the same directory. For example, the information such as the flag or the like that shows whether the plurality of the respective data files to be recorded into the directory form the one sequential digital stream data or not can be included.

Incidentally, in Embodiment 1, both of the movement of the first data file 24 recorded in the first directory 32 into the second directory 51, and the movement of the record representing the first data file 24 stored in the first management table in the first management file 33 into the second management table in the second management file 52 are performed immediately before the ending of the recording (Step S112). These movements may be performed at any time after reserving the table area that can store the information representing the first data file 24 into the second management table in the second management file 52 (Step S109).

Embodiment 2

Figure 8:
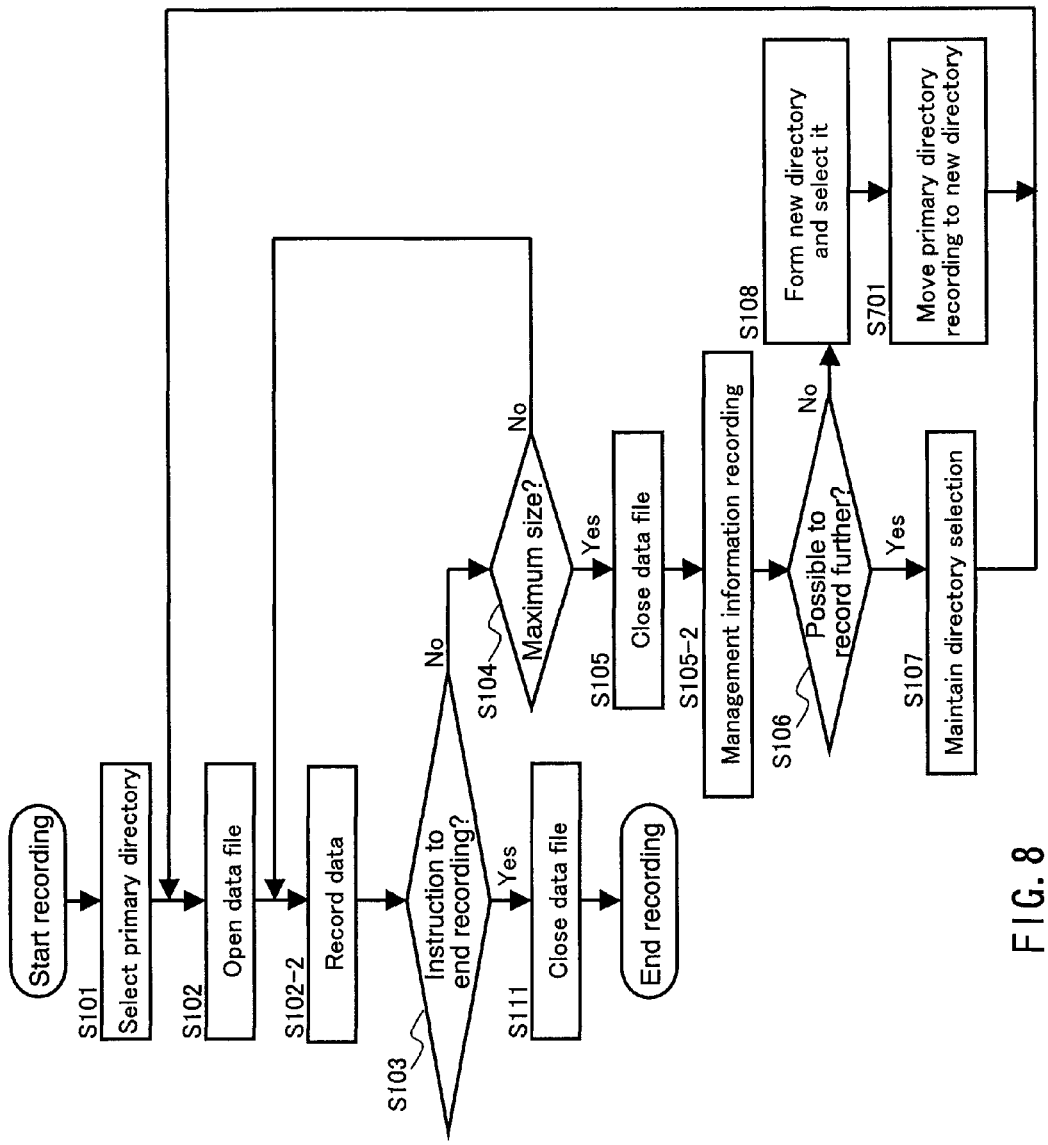
FIG. 8 is a flow chart showing an operation of a data recording system of Embodiment 2.

Embodiment 2 is a modified example of the operation of the data recording system 1 of Embodiment 1. FIG. 8 is a flow chart showing the operation of the data recording system 1 of Embodiment 2. The example of the operation of the data recording system 1 for recording the digital stream data 21 is explained below according to the flow chart of FIG. 8 with reference to FIGS. 2, 3, 5, 9 and 7. In the flow chart shown in FIG. 8, the steps similar to the steps in the flow chart shown in FIG. 4 are denoted by the same reference numerals, and a part of the explanation thereof will be omitted.

Also in the present embodiment, similarly to Embodiment 1, a case where the digital stream data 21 shown in FIG. 2 is recorded into the directory shown in FIG. 3 will be exemplified for the explanation.

As shown in FIG. 3, since the data file number recorded in the first directory 32 is 98 that is less than the predetermined maximum data file number of 99, the file generating part 3 selects the first directory 32 as the directory for recording the data file primarily (Step S101).

The file generating part 3 opens the first data file 24 (Step S102). The file generating part 3 starts reading the data from the starting pint 22 of the digital stream data 21 shown in FIG. 2, and records the read data into the first data file 24. While there is no recording ending instruction (No in Step S103), and the first data file 24 does not reach the predetermined maximum file size (No in Step S104), the first data file 24 records the digital stream data 21.

In the case where the first data file 24 reaches the predetermined maximum file size (Yes in Step S104), the file generating part 3 closes the first data file 24 (Step S105), and checks whether a further data file can be recorded into the first directory 32 or not (Step S106). The management information generating part 4 adds the record representing the first data file 24 into the first management table.

As shown in FIG. 5, at the time of recording the first data file 24 into the first directory 32, the data file number recorded in the first directory 32 becomes the predetermined maximum data file number of 99. No more data file can be recorded into the first directory 32. Thus, the file generating part 3 judges that no more data file can be recorded into the first directory 32 (No in Step 106).

Since the file generating part 3 cannot record a further data file into the first directory 32, the file generating part 3 newly forms the second directory 51, and selects it for recording data that is read after that (Step S108). Here, the file generating part 3 moves the data file for forming the digital stream data 21 that is recorded in the first directory 32, that is, the first data file 24 into the second directory 51 (Step S701). This processing is different from the processing in the flow chart shown in FIG. 4.

Here, the management information generating part 4 generates the second management file 52 having the second management table into the second directory 51 that is formed newly. The management information generating part 4 moves the record representing the first data file 24 that is stored in the first management table in the first management file 33 into the second management table in the second management file 52.

Figure 9:
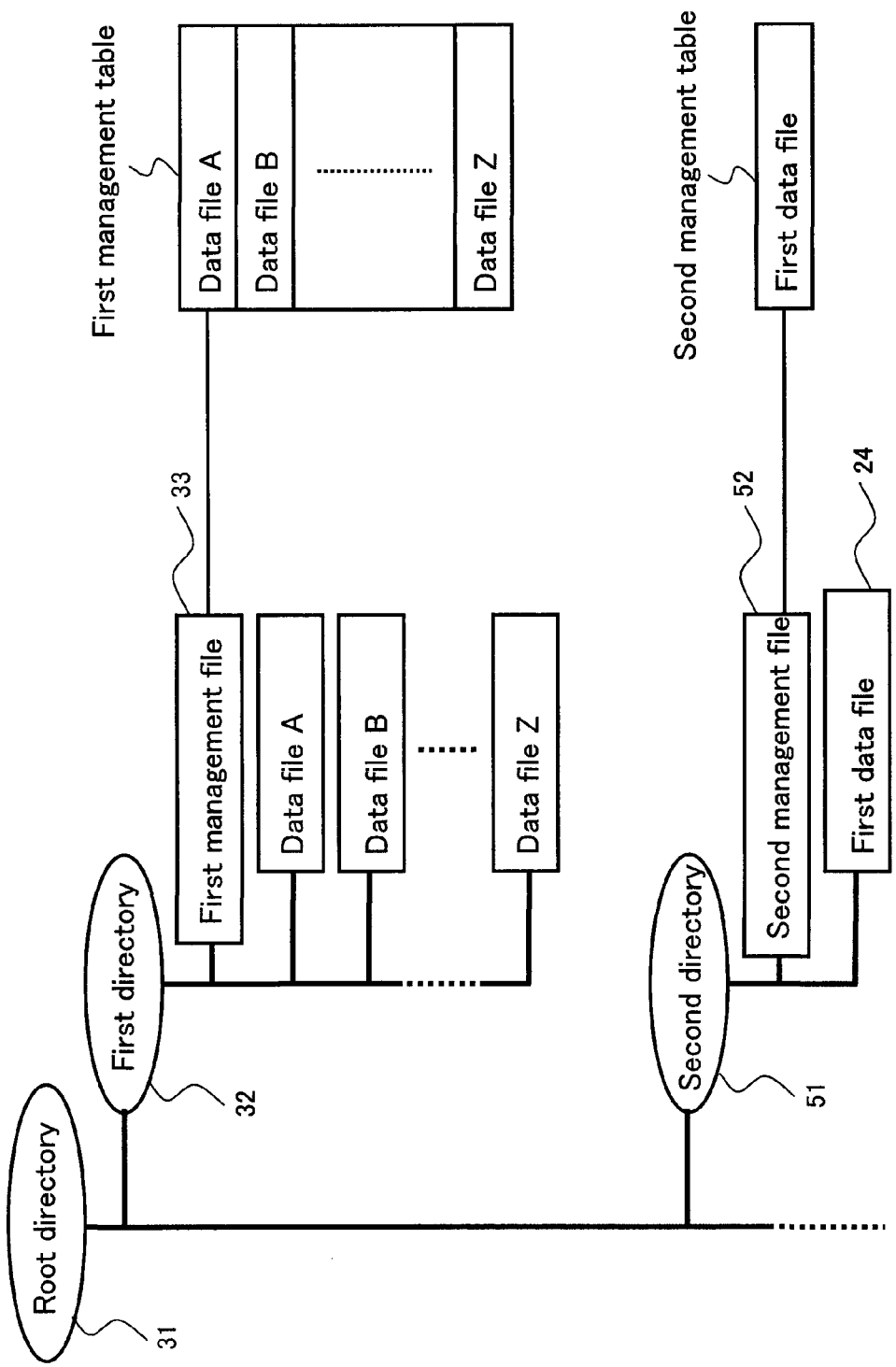
FIG. 9 is a view showing a directory structure after moving the first data file from the first directory to the second directory.

FIG. 9 is a view showing a directory structure after moving the first data file 24 from the first directory 32 to the second directory 51. The file generating part records data files after the first data file 24, that are, the second data file 25 and the third data file 26 into the second directory 51.

After moving the first data file 24 into the second directory 51 (Step S701), an operation until recording the second data file and the third data file into the second directory 51 is similar to the operation in Embodiment 1. Also in the present embodiment, similarly to the example shown in FIG. 7 in Embodiment 1, the first data file 24, the second data file 25 and the third data file 26 are recorded into the second directory 51. Moreover, the records representing the first data file 24, the second data file 25 and the third data file 25 are added in this order also into the second management table in the second management file 52.

As described above, the three data files forming the one sequential digital stream data 21 are recorded into one directory that is the second directory 51.

As described above, also in Embodiment 2, in the case where the file generating part 3 divides the one sequential digital stream data into a plurality of data files and records them, the plurality of the divided recorded data files can be recorded into the same directory.

According to the operation of the present embodiment, the plurality of the data files that are generated by dividing the digital stream data are recorded into the same directory. Thus, the plurality of the data files that are divided from the one digital stream data can be managed easily, and the convenience thereof is improved. Further, the management file can include the information that is effective only in the same directory.

Moreover, in Embodiments 1 and 2, the management file 33 including the management table for managing an order of recording the data files recorded in the directory, that is, the recording order is recorded in each of the directories, but the management file is not necessarily provided in each of the directories. For example, the management file may be recorded into another directory that is different form the managing directory, and the management tables relating to the plurality of the directories may be integrated into one management file, as long as their corresponding relationship can be recognized.

Moreover, Embodiments 1 and 2 explained the case where, when no more data file can be recorded into the first directory 32, the file generating part 3 newly forms the second directory 51 and selects it for recording the data files after that, but the file generating part 3 may select the existing directory other than the first directory 32 instead of the new directory, as long as it can record the data files.

Embodiment 3

The present embodiment is a modified example of Embodiment 1 described above. A structure of the data recording system of Embodiment 1 is similar to the structure shown in FIG. 1. In the data recording system of the present embodiment, the structures of the directories for respectively recording the management files and the data file are different from the directory of Embodiment 1. In the present embodiment, the data file is recorded into a data-file directory, and the management file is recorded into a management-file directory that is provided separately from the data-file directory. The management file manages a group of data files as a group. The number of the data files that can be managed by the one management file is limited. Incidentally, the plurality of the data files that are generated by dividing the one sequential digital stream data are managed so as to belong to the same group.

Figure 10:
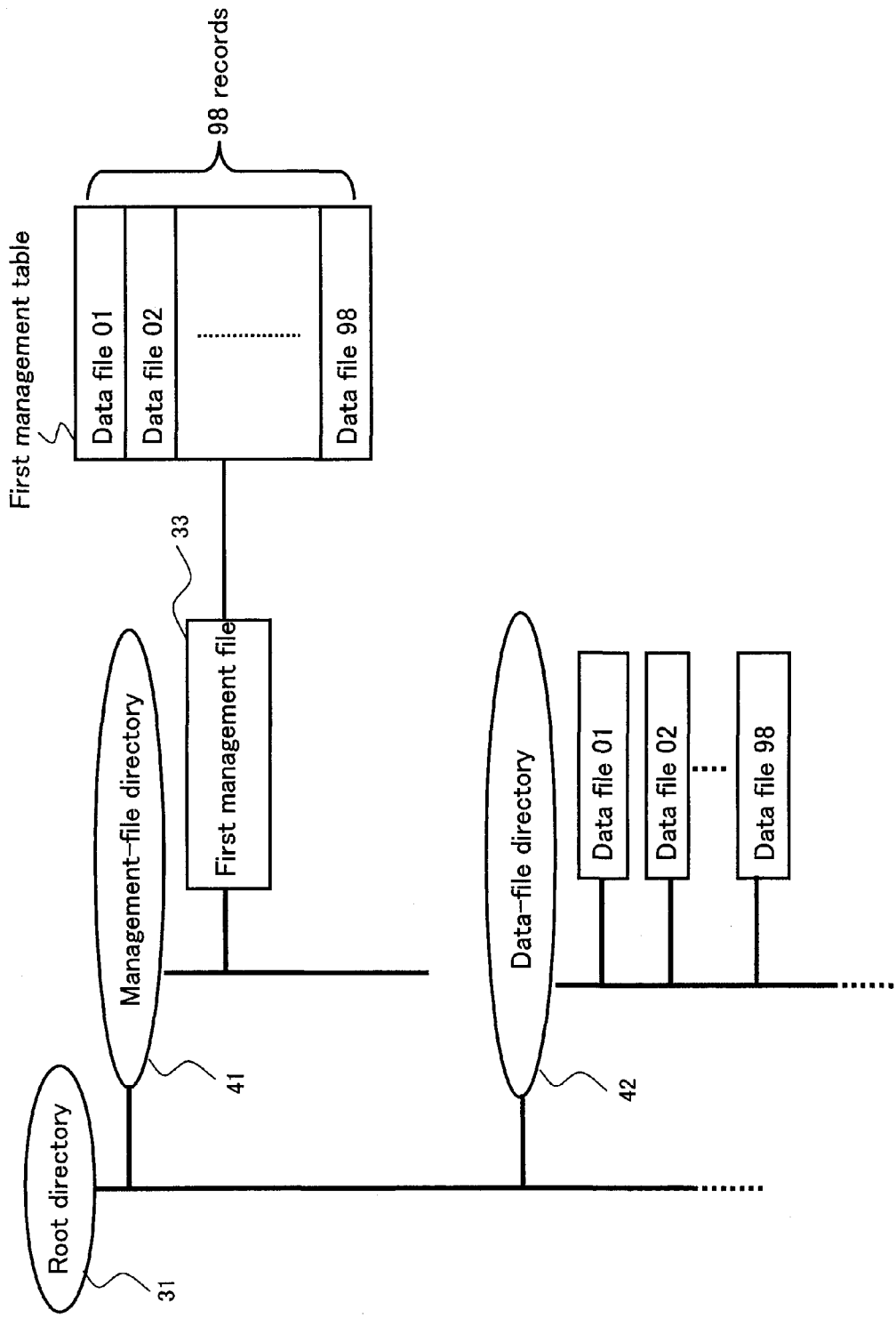
FIG. 10 is a view showing an example of a directory structure of a recording medium of Embodiment 3.

FIG. 10 is a view showing an example of a directory structure of the recording medium 5 of the present embodiment. In the example shown in FIG. 10, a management-file directory 41 and a data-file directory 42 exist under the root directory 31. The data-file directory 42 records the data file. The management-file directory 41 records the management file that includes the management information of the data file recorded in the data-file directory 42. According to such a structure, the number of the data files managed by one management file (for example, the number of records that can be recorded in the management table of the management file) is limited. As one example, it will explain a case where a maximum data file number that can be managed by one management file is 99.

In the present embodiment, the file generating part 3 records the data files that are generated by dividing the digital stream data 21 into the data-file directory 42. The management information generating part 4 generates management information for managing the plurality of the data files that are generated by the file generating part 3, and adds them into the management file in the management-file directory 41. When the management file judging part 6 adds, into the management file, management information of a part of data files among the plurality of the data files that are generated from the digital stream data by the file generating part 3, if the number of the recorded data files reaches the maximum data file number that can be managed by the management file, the management file judging part 6 switches the recording management file into another management file.

Figure 11:
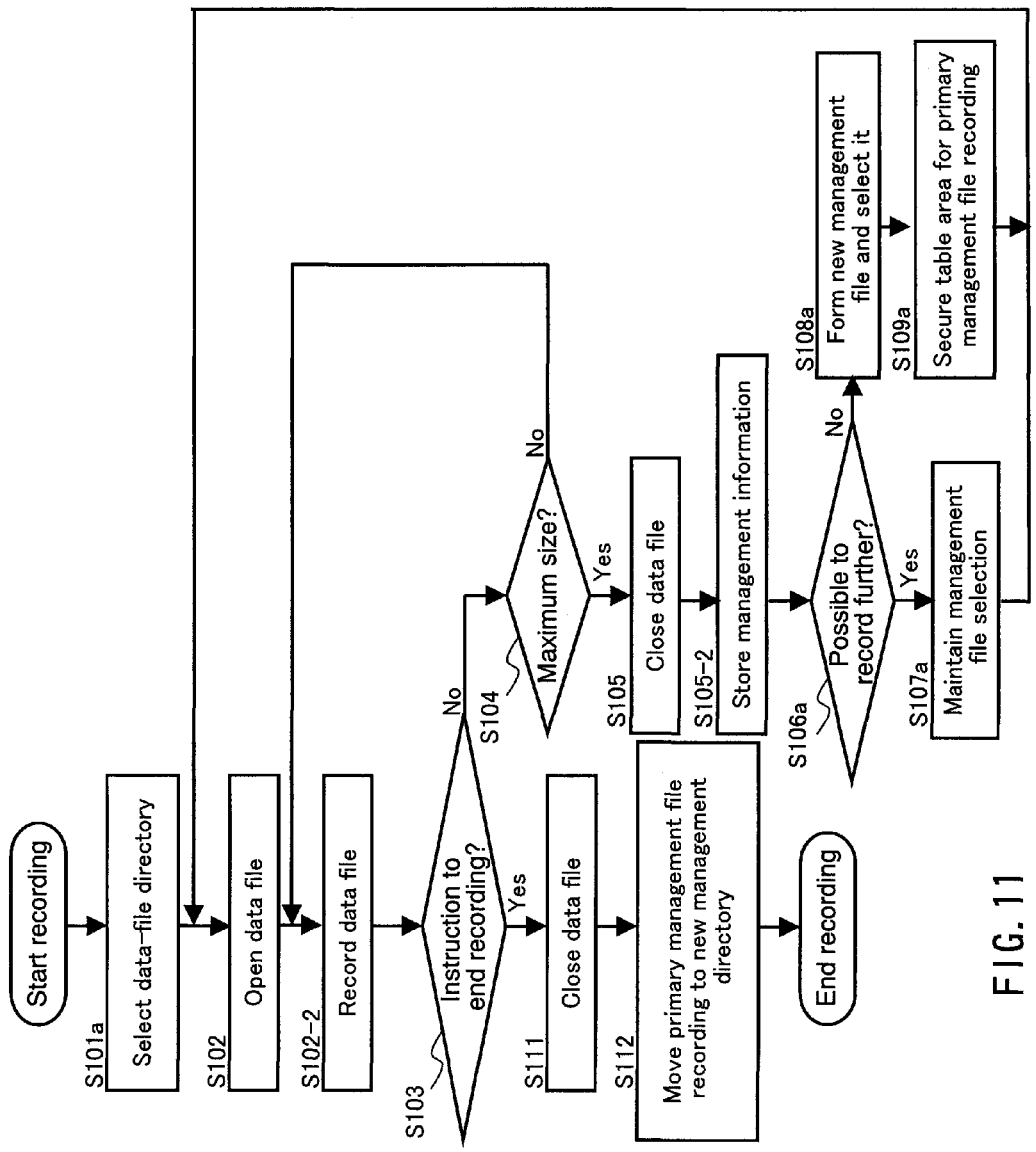
FIG. 11 is a flow chart showing an example of an operation of a data recording system of Embodiment 3.

Next, an example of an operation of the data recording system of the present embodiment when dividing and recording the digital stream data 21 will be explained. FIG. 11 is a flow chart showing an example of an operation of the data recording system 1. The operation shown in FIG. 11 is an example of the operation of the data recording system 1 when the Me generating part 3 reads and record the digital stream data 21 shown in FIG. 2 from its starting point 22 to its ending point 23. In the flow chart shown in FIG. 11, steps that are similar to those in the flow chart shown in FIG. 4 are denoted by the same reference numerals, and a part of the explanation thereof will be omitted.

The file generating part 3 selects the data-file directory 42 as the directory for recording the data file (Step S101a). The file generating part 3 opens the first data file 24 (Step S102). Then, the file generating part 3 starts reading the data from the starting point 22 of the digital stream data 21 shown in FIG. 2, and records the read data into the first data file 24. While there is no recording ending instruction (No in Step S103), and a size of the recorded data does not reach a predetermined maximum file size (No in Step S104), the digital stream data 21 is recorded into the first data file 24 (Step S102-2).

In the case where the size of the first data file 24 reaches the predetermined maximum file size (Yes in Step S104), the file generating part 3 closes the first data file 24 (Step S105), and checks whether a further data file can be recorded into the first directory 32 (Step S106). The management information generating part 4 adds a record representing the first data file 24 into the first management table of the first management file 33 of the management-file directory 41 (Step S105-2). Thereby, the number of the records that are recorded in the first management table becomes 99.

As described above, when the management information of the first data file 24 is recorded, the management file judging part 6 judges whether management information of a new data file further can be added into the first management file 33 that is selected currently or not (Step S106a). This judgment can be performed by, for example, comparing the number of records that are stored in the first management table of the first management file 33 with the maximum data file number that can be managed by one management file (for example, the number of records that can be stored in the management table). For example, in the present example, since the number of the records that are stored in the first management table is currently 99, and the maximum data file number that can be managed by one management file also is 99, it is judged that no more record can be added into the first management file (No in Step S106a).

If it is judged that no more management information can be added into the currently selected first management file 33, the management file judging part 6 newly forms the second management file 52 in the management-file directory 41, and switches from the first management file 33 into this second management file 52 for storing the management information (Step S108a). The management information generating part 4 reserves a table area that can store the records of the data files 24 stored in the first management file 33 into the second management table in the second management file 52 (Step S109a). The management information of data files that are generated from the digital stream data 21 by the file generating part 3 thereafter (for example, the second data file 25 and the third data file 26) is recorded into this second management file 52.

Whereas, if a further record can be added into the management table of the management file that currently stores the management information in Step S106a, the management file judging part 6 continues to record the management information into this management file (Step S107a).

Thereafter, the file generating part 3 forms a new data file and opens it (step S102), and records the sequent digital stream data 21 (Step S102-2). In this way, the processing of Steps S102 to S109a are repeated until the recording ending instruction is provided in Step S103.

Figure 12:
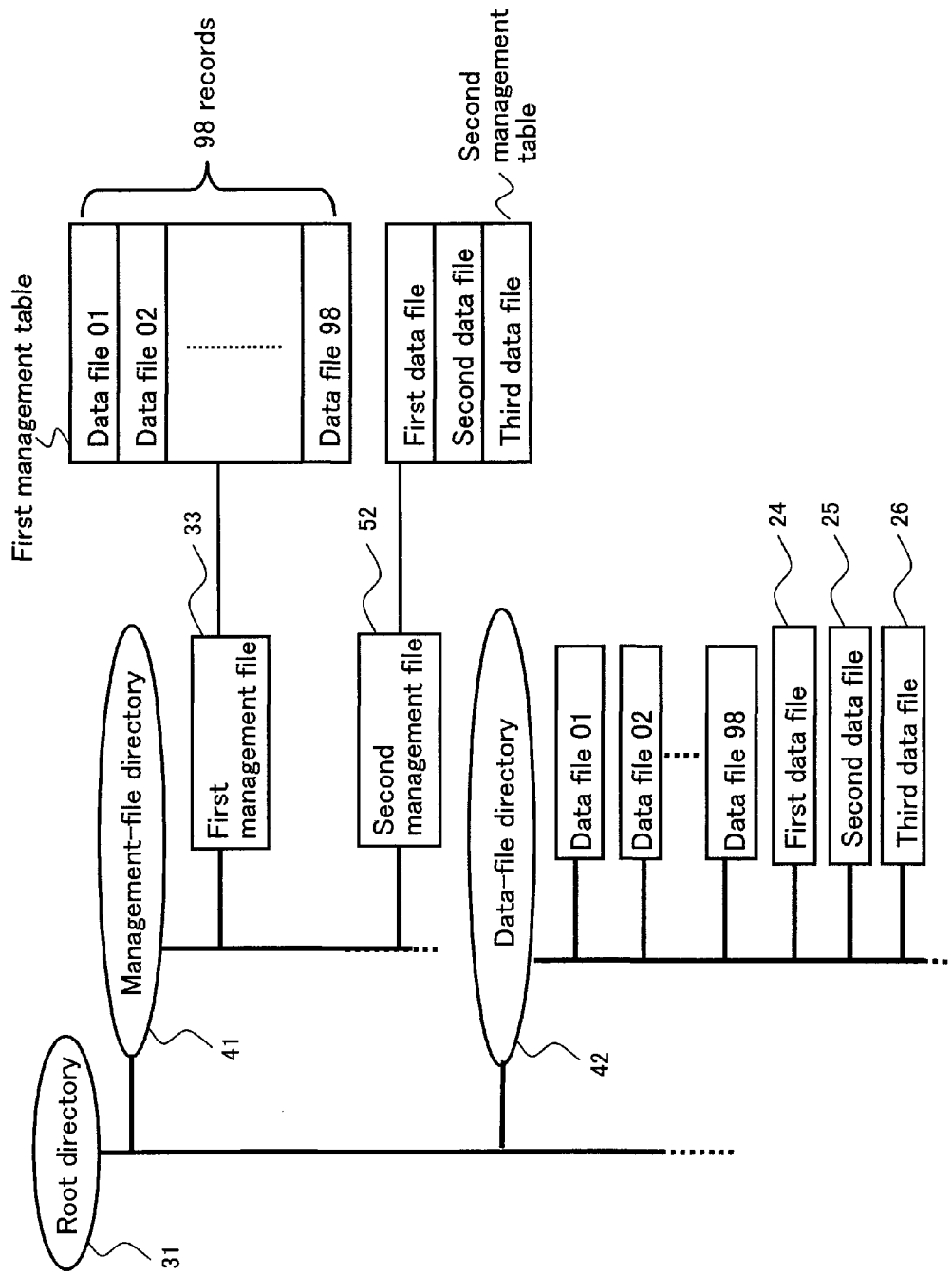
FIG. 12 is a view showing a directory structure after management information of three data files are recorded.

FIG. 12 is a view showing a directory structure after the first data file 24, the second data file 25, the third data file 26 and their management information are recorded. In the example shown in FIG. 12, the first data file 24, the second data file 25 and the third data file 26 are added into the data-file directory 42. The management information of these data files is stored as being arranged in the recording order of the data files, as the records representing the respective data files, in the second management table of the second management file 52 of the management-file directory 41. As described above, the three data files forming the one sequential digital stream data 21 are recorded in one directory that is the second directory 51.

Embodiment 4

Figure 13:
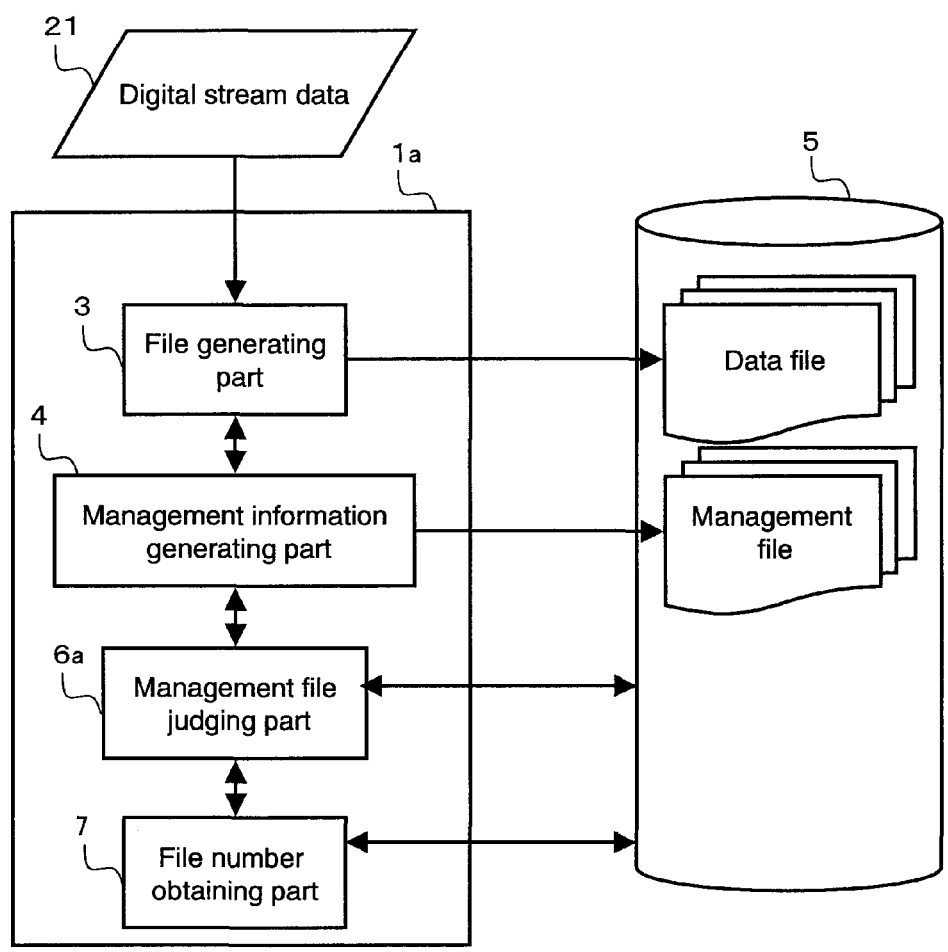
FIG. 13 is a functional block diagram showing a structure of a data recording system of Embodiment 4.

FIG. 13 is a functional block diagram showing a structure of a data recording system of the present embodiment. In FIG. 13, functional blocks that are same as those shown in FIG. 1 are denoted by the same reference numeral, and the explanation thereof will be omitted. As shown in FIG. 13, a data recording system 1a is provided with the file generating part 3, the management information generating part 4, a management file judging part 6a and a file number obtaining part 7. The data recording system 1a is connected with the recording medium 5.

The file generating part 3 divides the digital stream data 21 into a plurality of data files and records them as a plurality of data files into the recording medium 5. The file number obtaining part 7 obtains the number of the data files that are managed by at least one management file among the management files that are already recorded in the recording medium 5. After the file generating part 3 records plural sets of the digital data, the management file judging part 6a determines a management file for storing the management information by comparing a sum of the number of the plurality of the recorded data files and the number of the data files that are managed by the management file obtained by the file number obtaining part 7 with the maximum data file number L. The management information generating part 4 adds the management information of the plurality of the data files into the management file that is determined by the management file judging part 6a.

In the present embodiment, structures of directories for recording the management file and the data file are similar to the directories of Embodiment 3 described above. That is, the management-file directory and the data-file directory are provided, respectively. The present embodiment will provide a case where a directory structure of the recording medium 5 is the same as the directory structure shown in FIG. 10.

Figure 14:
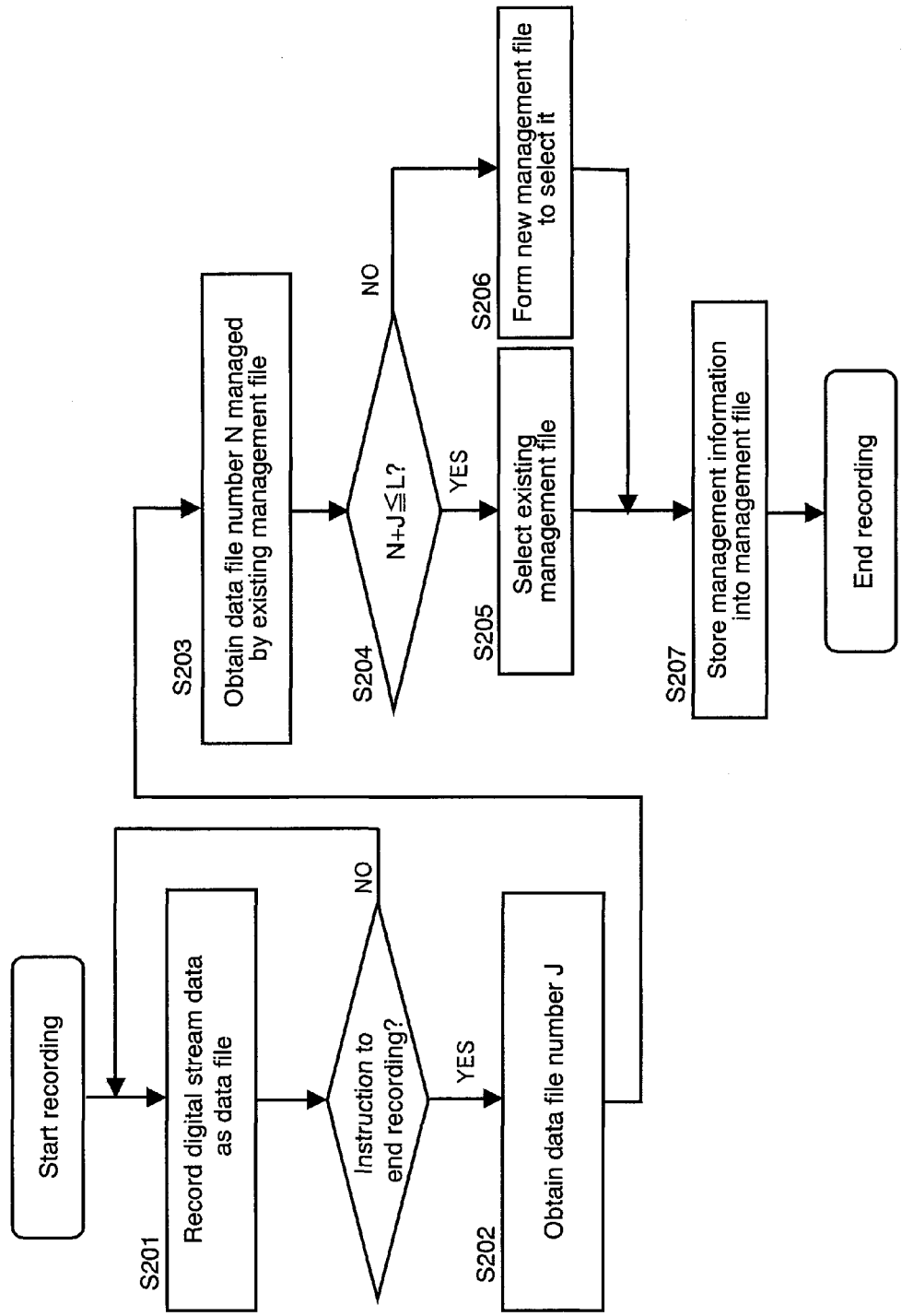
FIG. 14 is a flow chart showing an example of an operation of the data recording system of Embodiment 4.

Next, an example of an operation of the data recording system of Embodiment 1 for dividing and recording the digital stream data 21 will be explained. FIG. 14 is a flow chart showing an example of an operation of the data recording system 1. The operation shown in FIG. 14 is an example of the operation of the data recording system 1 when the file generating part 3 reads and records the digital stream data 21 shown in FIG. 2 from its starting point 22 to its ending point 23.

In Step S201, the file generating part 3 reads the digital stream data 21, and records it into the data-file directory 42 as the data file. In the case where a size of the digital stream data 21 exceeds the predetermined maximum file size, the file generating part 3 divides the digital stream data 21 into a plurality of (J) data files having a size that is less than the predetermined maximum file size, and records them into the data-file directory 42.

The file generating part 12 continues recording the digital stream data 21 until detecting the recording ending instruction. When the file generating part 3 detects the recording ending instruction and ends the recording into the data-file directory 42, the management file judging part 6a obtains the number (J) of the data files that are recorded by the file generating part 3 (Step S202).

In Step S203, the file number obtaining part 7 obtains the number (N) of the data files managed by each of the management files (here, the first management file 33 is exemplified) that are already recorded in the management-file directory 41. The file number obtaining part 7 obtains the number of the data files managed by the first management file 33, by obtaining the record number that is stored in the first management table included in the first management file 33, for example. Incidentally, there are a plurality of the management files in the management-file directory 41, the file number obtaining part 7 may obtain the data file number of the newly updated management file, for example. Also, the file number obtaining part 7 can obtain the data file number of each of the all management files, and perform the below-described processing with respect to each of the management files.

In Step S204, the directory selecting part 105 judges whether a sum (N+J) of the file number N that is obtained in Step S203 and the number J of the data files recorded in the data-file directory 42 is equal to or less than the maximum data file number L that can be managed by the management file or not. As a result of the judgment, in the case where N+J is equal to or less than L (N+J≤L) (Yes in Step S204), the management file judging part 6a selects the existing management file as the storing management file for storing management files of the J data files (Step S205). As a result of the judgment, in the case where N+J is more than L (N+J>L) (No in Step S204), the management file judging part 6a newly forms a management file, and selects the formed management file as the storing management file (Step S206).

For example, in the directory structure shown in FIG. 10, in the case where the first management file 33 exists in the management-file directory 41, the file number obtaining part 7 obtains the data file number N that is managed by the first management file 33, that is, the record number that is stored in the first management table. In the example shown in FIG. 10, the number of the data files that are managed by the first management file 33 is 98 (N=98). Moreover, for example, in the case where the digital stream data 21 is divided into the three data files as shown in FIG. 2, the data file number J that is newly recorded into the data-file directory 42 becomes 3 (J=3). In this case, the sum (N+J) becomes 101 (N+J=98+3=101), which exceeds the maximum data file number of 99 that can be managed by the management file (L=99). Thus, the management file judging part 6a forms a new management file (herein, the second management file 52 is exemplified), and selects it as the storing management file.

In Step 207, the management information generating part 4 adds the management information of the J (J=3) data files into the recording management file that is selected by the management file judging part 6a. That is, the management information generating part 4 adds J (J=3) records into the second management table of the second management file. Thereby, the management information of the J (J=3) data files that are generated by dividing the digital stream data 21 is stored into the one management file (second management file 52).

According the management information generating part 4, a directory structure after recording the management information of the J (J=3) data files into the second management file is similar to the directory structure shown in FIG. 12.

As described above, the data recording system 1 of the present embodiment can divide the digital stream data 21 into the plurality of the data files, and manage them in the same management file. Thus, the management of the plurality of the data files that are divided from the same digital data becomes simple. For example, when a reproducing system reads out a plurality of the data files and reproduces the digital data, the reproducing system is not required to refer to a plurality of the management files, but can reproduce the digital data only by referring the one management file. Moreover, for example, when a user handles the plurality of the data files that are generated by the division as the one sequential digital data, he/she is not required to refer to the plurality of the management files, but is required to refer to only the management file that stores the management information of these data files.

Embodiment 5

Hereinafter, the embodiment of the present invention will be explained below with reference to the drawings.

Figure 15:
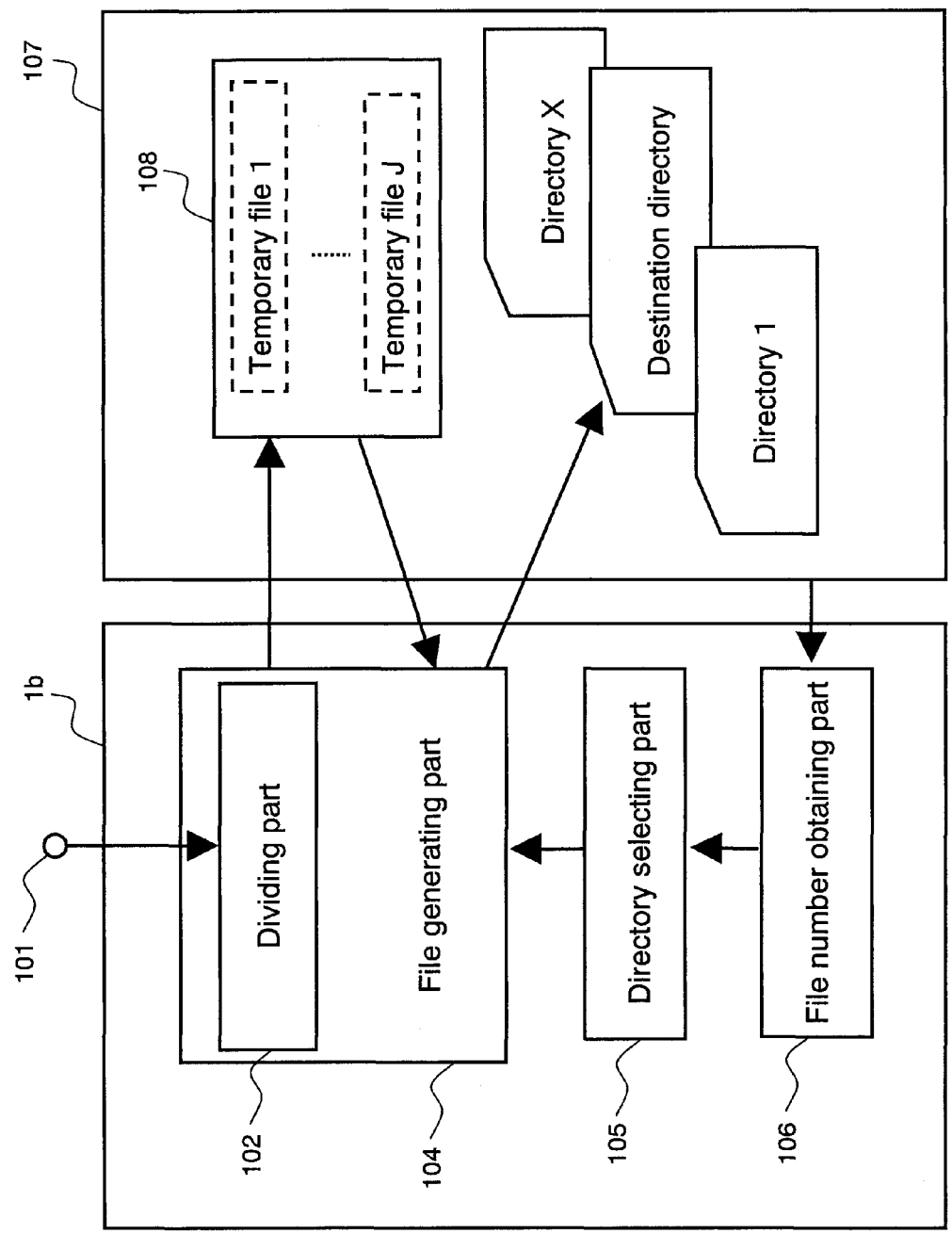
FIG. 15 is a functional block diagram showing a structure of a data recording system of Embodiment 5.

FIG. 15 is a functional block diagram showing a structure of a data recording system of the present embodiment. As shown in FIG. 15, a data recording system 1b is provided with a file generating part 104 including a dividing part 102, a directory selecting part 105 and a file number obtaining part 106.

The data recording system 1b is in a state where it can record data into the recording medium 107 and read out the data from the recording medium 107. In a recording area of the recording medium 107, an area for a directory that records a file and a temporary turnout area 108 are included. Incidentally, in the present embodiment, the temporary turnout area 108 is included in the recording area of the recording medium 107, but may be a recording area of a recording medium that is provided separately from the recording medium 107.

The dividing part 102 divides digital stream data that is input from a data input terminal 101 into, for example, J data files, and saves them into the temporary turnout area 108. The file number obtaining part 106 obtains the number of files that are recorded in at least one directory among the directories on the recording medium 107. The directory selecting part 105 selects a recording directory for recording the data files that are saved in the temporary turnout area 108 by the dividing part 102.

In the data recording system 1b of the present embodiment, a maximum data file number that can be recorded in one directory is predetermined. The directory selecting part 105 selects, as the recording directory, a directory in which the file number does not exceed the maximum data file number in the case where the directory selecting part 105 records the plurality of the data files that are generated by dividing the digital stream data.

The data recording system 1b may be mounted by a computer that is integrated into equipment having a function of recording digital stream data, such as a digital still camera, a video camera, a mobile phone, a PDA, a music player, and a video recorder (a DVD recorder, a HDD recorder, a TV set having a recording function), for example. Also, the data recording system 1b may be mounted in a general computer such as a personal computer.

For example, in the equipment or the general computer having the function of recording the above-described digital stream data (hereinafter, called the equipment), the data recording system 1b can be mounted as a system that receives an order from a higher apparatus for controlling writing and read-out of data with respect to a recording medium, and records the data into the recording medium. Incidentally, the higher apparatus and the data recording system 1b may be accommodated by the same hardware in the equipment, and may be accommodated by different hardware.

Functions of the dividing part 102, the file generating part 104, the directory selecting part 105 and the file number obtaining part 106 can be achieved by, for example, a CPU executing a predetermined program.

Examples of the recording medium 107 include a semiconductor memory, an optical disk, a hard disk and the like. More specifically, these recording media are provided by the equipment, are attachable/detachable with respect to the equipment, are connected with the equipment or the like. Examples of the recording medium 107 include a attachable/detachable memory card, a semiconductor memory or a hard disk that are integrated in a computer, a DVD and the like.

Examples of the digital stream data 21 handled by the data recording system 1b include moving image data showing a video image and audio, music data, game data and the like. Incidentally, the data that can be handled by the data recording system 1b is not limited to the digital stream data 21 but includes all digital data.

Here, an example where the digital stream data 21 is divided into a plurality of the data files by the file generating part 3 will be explained. FIG. 2 is a schematic view showing a state of dividing the digital stream data 21 into a plurality of the data files.

The digital stream data 21 shown in FIG. 2 as an example is read by the dividing part 102 and is recorded into the temporary turnout area 108 of the recording medium 107. The dividing part 102 reads the digital stream data 21 from its starting point 22 to its ending point 23 sequentially and generates the data files. The dividing part 102 starts the reading from the starting point 22, and records the read data into the first data file 24. After some time, a size of the first data file 24 reaches a predetermined maximum file size. At this time, the dividing part 102 cannot record the data into the first data file 24 any more, and thus records sequent data into the second data file 25. Incidentally, the predetermined maximum file size is determined by a limitation or the like of a file system (FAT32 or the like) adopted by a computer, for example.

After some time, a size of the second data file 25 also reaches the predetermined maximum file size, so that the dividing part 102 records sequent data into the third data file 26. Then, the recording is ended at the ending point 23. As described above, the one sequential digital stream data 21 is divided into the three data files 24, 25, 26 so as to be recorded into the temporary turnout area 108.

FIG. 16 is a view showing an example of a directory structure of the recording medium 107 for recording the data files. In FIG. 16, an ellipse represents the directory, and a rectangle represents the file. Under the root directory 31, there is the first directory 32 for recording the data file. The maximum data file number that can be recorded into this first directory 32 is predetermined to be 99. In the example shown in FIG. 16, the 98 data files already are recorded in the first directory 32.

Figure 17:
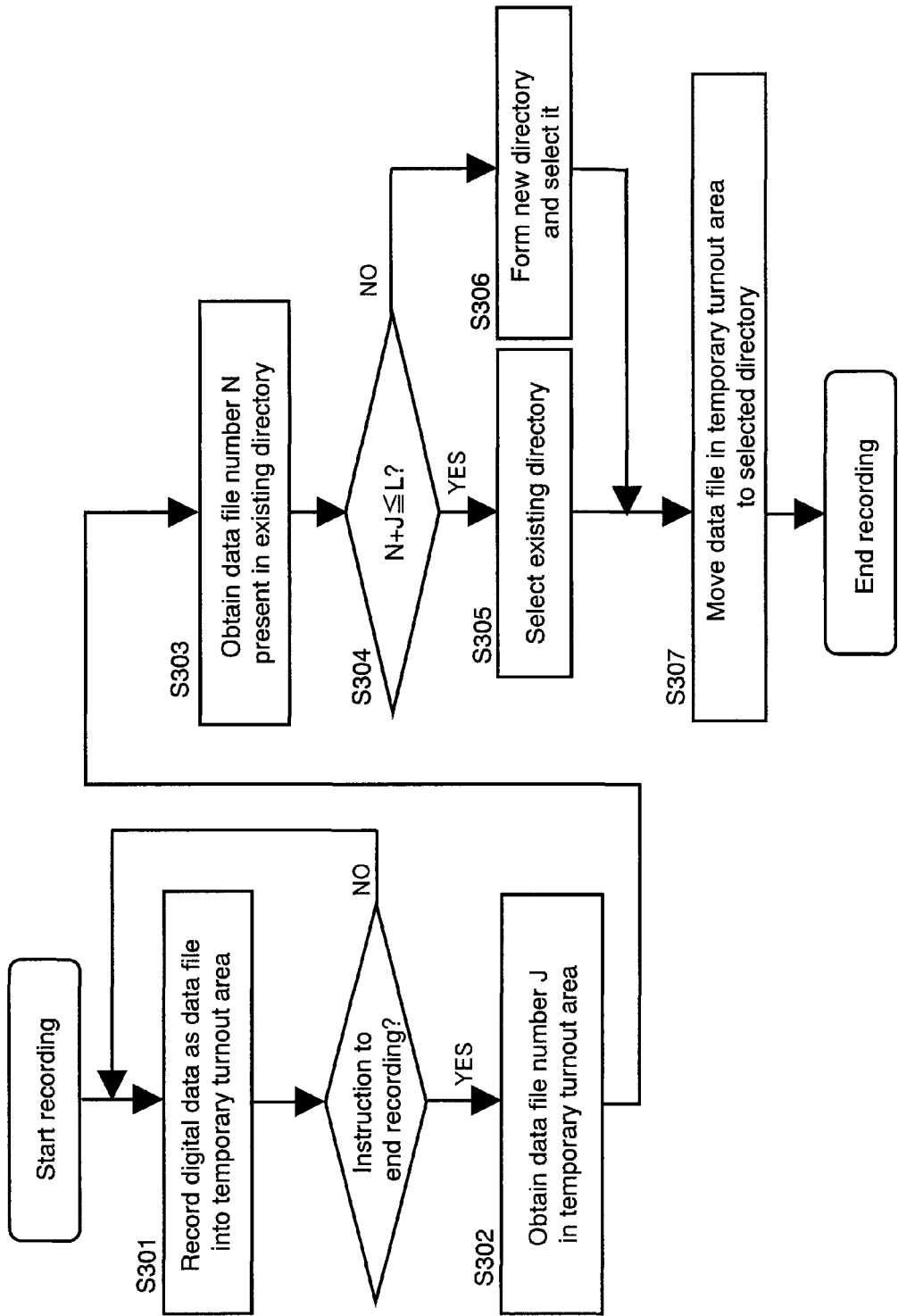
FIG. 17 is a flow chart showing an example of an operation of the data recording system of Embodiment 5.

Next, an example of an operation of the data recording system 1b for dividing and recording the digital stream data 21 will be explained. FIG. 17 is a flow chart showing an example of the operation of the data recording system 1b.

In Step S301, the dividing part 102 reads the digital stream data 21 via the data input terminal 101, and records it as the data file into the temporary turnout area 108. In the case where the size of the digital stream data 21 exceeds the predetermined maximum file size, the dividing part 102 divides the digital stream data 21 into a plurality (J) of data files having a size that is equal to or less than the predetermined maximum file size, and records them into the temporary turnout area 108.

The dividing part 102 continues recording the digital stream data 21 until detecting the recording ending instruction. When the dividing part 102 detects the recording ending instruction and ends the recording into the temporary turnout area 108, the directory selecting part 105 obtains the number (J) of the data files that are recorded in the temporary turnout area 108 (Step S302).

In Step S304, the file number obtaining part 106 obtains the number (N) of the data files that are recorded in the existing directory. The file number obtaining part 106, for example, accesses the files in the existing directory so as to obtain the file number in this directory. The file number obtaining part 106 can determine the existing directory from which the data file number is obtained as the directory that is preset to be a directory for recording the data files, for example. That is, the file number obtaining part 106 obtains the number of the data files recorded in the directory that is preset as the directory for recording the data files.

Incidentally, the existing directory from which the file number obtaining part 106 obtains the file number is not limited to the above-described directory that is selected in advance. For example, the file number obtaining part 106 may obtain the file numbers of all of the directories that exist under the predetermined directory respectively, or may obtain the file numbers of all of the directories included in the recording medium 107.

In Step S304, the directory selecting part 105 judges whether a sum (N+J) of the file number N that is obtained in Step S303 and the number J of the data files recorded in the temporary turnout area 108 is equal to or less than the maximum data file number (L) that can be recorded in the directory or not. As a result of the judgment, in the case where N+J is equal to or less than L (N+J≤L) (Yes in Step S304), the directory selecting part 105 selects the existing directory as the recording directory for recording the J data files that are recorded in the temporary turnout area 108 (Step S305). As a result of the judgment, in the case where N+J is more than L (N+J>L) (No in Step S304), the directory selecting part 105 newly forms a directory, and selects the formed directory as the recording directory (Step S306).

For example, in the directory structure shown in FIG. 16, in the case where the first directory 32 exists as the existing directory, the file number obtaining part 106 obtains the data file number N in the first directory 32. In the example shown in FIG. 16, the data file number in the first directory 32 is 98 (N=98). Moreover, for example, in the case where the digital stream data 21 is divided into the three data files as shown in FIG. 2, the number of the data files recorded into the temporary turnout area 108 is 3 (J=3). In this case, the sum (N+J) becomes 101 (N+J=98+3=101), which exceeds the maximum data file number of 99 that can be recorded in the directory (L=99). Thus, the directory selecting part 105 forms a new directory, and selects it as the recording directory.

In Step 307, the file generating part 104 moves the J data files that are recorded in the temporary turnout area 108 into the recording directory selected by the directory selecting part 105. Thereby, the J data files that are generated by dividing the digital stream data 21 are recorded into the one directory.

Figure 18:
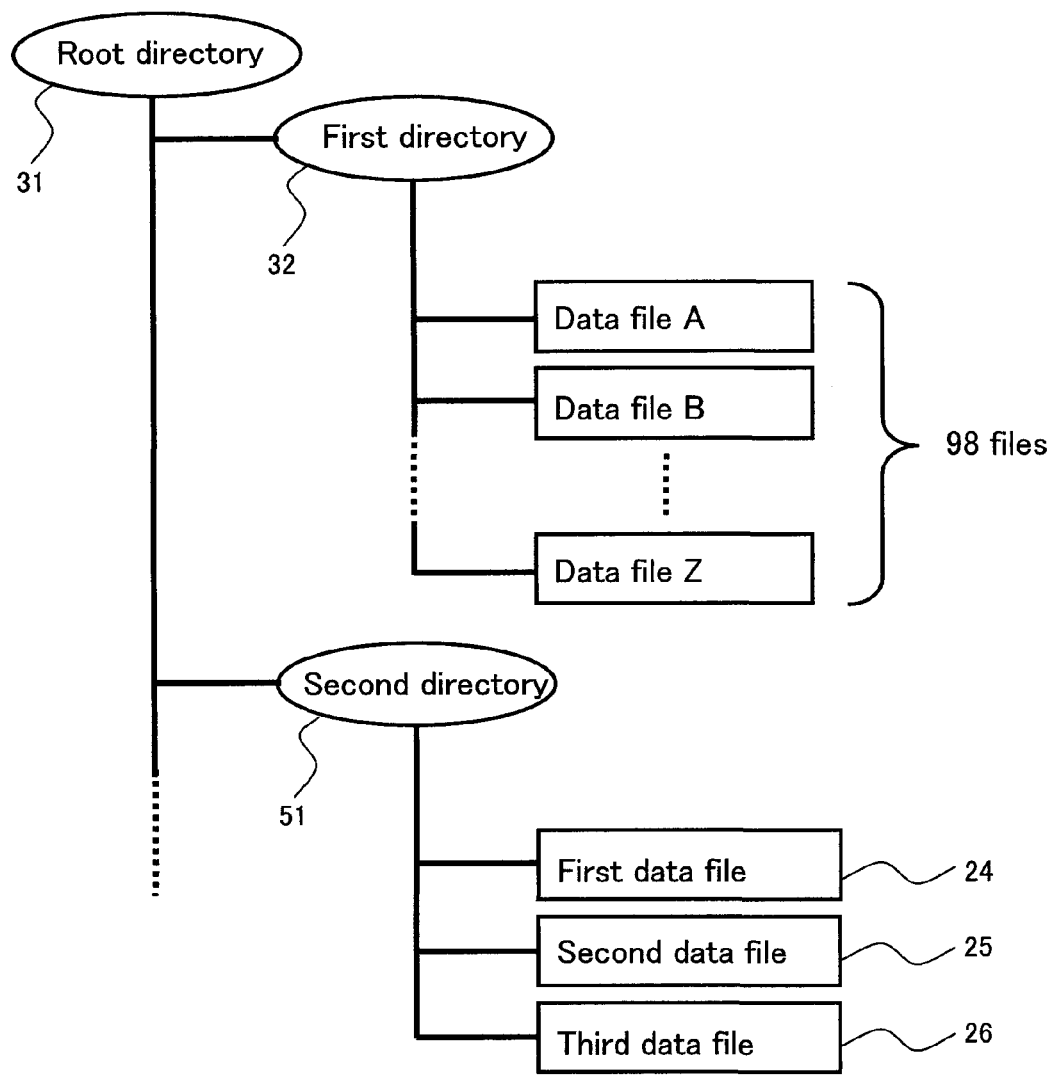
FIG. 18 is a view showing an example of a directory structure in the case where data files are recorded by a file generating part.

FIG. 18 is a view showing an example of a directory structure in the case where the data files are recorded by the file generating part 104 in Step S307. In the example shown in FIG. 18, the second directory 51 newly is formed by the directory selecting part 105. The three data files 24, 25, 26 that are generated by dividing the digital stream data 21 are recorded into the second directory 51 that is the newly formed directory. For example, in the case where the user manages the data relating to the digital stream data 21, the user is required to refer only to the second directory 51. Thus, the convenience for the user is improved.

Moreover, in the example shown in FIG. 18, only the data files that are generated by dividing the digital stream data are recorded in the directory, but files other than these data files may be present therein. For example, as shown in FIG. 19, the directory management file and the like that record information of each directory may exist in each directory.

Figure 19:
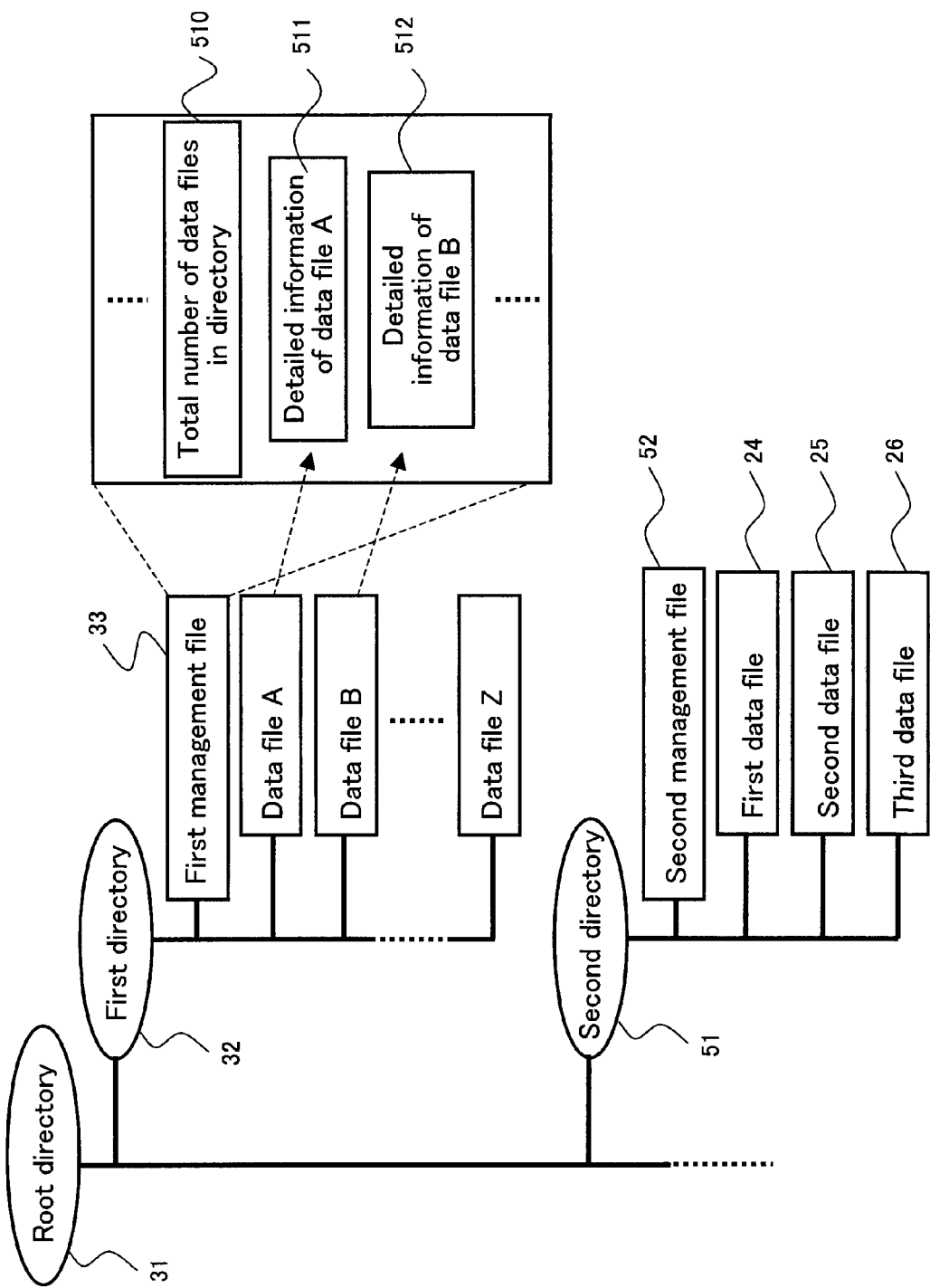
FIG. 19 is a view showing an example where a directory management file exists in each directory.

In the example shown in FIG. 19, in the first directory 32, the first management file 33 is recorded. In the first management file 33, information relating to the data files recorded in the first directory 32 is stored. For example, a number 510 of the data files that are stored in the first directory 32, detailed information 511, 512 of the respective data files and the like are included in the first management file 33. Also in the second directory, the second management file having information relating to the data files recorded in the second directory is recorded.

Since the number 510 of the files that are recorded in the directory managed by the management file is stored in the first management file 33, in the case where the file number obtaining part 106 obtains the data file number N recorded in the first directory 32, the file number obtaining part 106 can obtain the data file number N by referring to the first management file 33. As a result, the data recording system 1b can be achieved more easily.

The detailed information 511, 512 of the respective data files included in the first management file 33 may include a flag showing a relationship with another data file in the same directory, for example. An example of this flag is a flag for showing whether a certain data file is a data to be reproduced after a data file that is recorded immediately before the certain data file or not, that is, a flag for instructing to combine the reproduction seamlessly.

For example, a reproducing system that reads out and reproduces a plurality of data files utilizes this flag, thereby facilitating the seamless reproduction of a sequence of the data files that are generated by dividing the digital stream data. In the present embodiment, even in the case where the data is divided into a plurality of data files, the data files are recorded into the same directory, thereby facilitating not only the management of the data files by the user, but also the seamless reproduction of the plurality of the sequence of the data files.

Since the digital stream data 21 is divided into the plurality of the data files and recorded into the same directory, the information that is effective only in the same directory, like the above-described flag, can be set as the management file or the like.

Incidentally, the structure of the management file is not limited to the case of being provided in each directory as described above. For example, the management file of each of the other directories may be recorded in the management-file directory provided under the root directory 31. Also, the management file provided in the management-file directory and the management file provided in each directory may be used in combination.

As described above, the data recording system 1b in the present embodiment can divide the digital stream data 21 into the plurality of the data files, and record them into the same directory. Thus, the management of the plurality of the data files that are divided from the same stream data can be easy. For example, when the reproducing system reads out the plurality of the data files and reproduces the digital stream data, the reproducing system is not required to refer to the plurality of the directories, but is required to refer only to the one directory so as to reproduce the digital stream data. Moreover, when the user handles the plurality of the data files that are generated by the division from one sequential digital stream data, the user is not required to refer to the plurality of the directories, but is required to refer only to the directory in which these data files are recorded.

Moreover, the data recording system 1b in the present embodiment moves the digital stream data 21 into the directory after recording the digital stream data 21 into the temporary turnout area 108 once, and thus is not required to determine the recording directory at the time when starting to record the digital stream data 21. That is, before starting to record the digital stream data 21, the data recording system 1b is not required to obtain the information relating to the recording medium such as the file number in the directory and the like and to determine the recording directory. Thus, since the recording of the digital stream data 21 is started before determining the recording directory, a time to the starting of the recording can be reduced.

Incidentally, the files recorded into the directory are not limited to the data files generated by dividing the digital stream data. The maximum data file number L that can be recorded in the directory may be a maximum recording number of the data files that are generated by dividing the digital stream data, or may be, for example, a maximum recording number of files including other files besides the data files that are generated by dividing the digital stream data, such as text files and management files. Similarly to this, the file number N in the directory that is obtained by the file number obtaining part 106 may be the number of the data files generated by dividing the digital stream data, or may be the number of all files existing in the directory.

Moreover, the present embodiment has provided the case where one existing directory is present in the recording medium 107, but in the case where a plurality of the existing directories are present, the file number obtaining part 106 may obtain the file numbers that are recorded in the respective existing directories sequentially. Moreover, the directory selecting part 105 may determine the recording directory based on these file numbers.

Moreover, when moving the data files from the temporary turnout area 108 into the recording directory, the file number generating part 104 may change the file names such that the same file names are not present in the recording directory, may change the file names according to a naming rule of the file names in the recording directory, and may change the information of the data file.

Moreover, the file number obtaining part 106 obtains the file number N in the directory after receiving the recording ending instruction, but may obtain the file number N at the same time while recording the data files into the temporary turnout area 108.

Moreover, in the present embodiment, the directory selecting part 105 selects the recording directory by judging whether the sum (N+J) of the file number N of the existing directory and the file number J recorded in the temporary turnout area 108 is equal to or less than the maximum data file number L or not, but may select by comparing the value (N+J) with an arbitrary value that is equal to or less than L. For example, in the case of recording files with an allowance of two files compared with the maximum data file number L into the directory, the directory selecting part 105 selects the recording directory by judging whether the value (N+J) is equal to or less than, not the value L, but a value (L−2).

Embodiment 6

Figure 20:
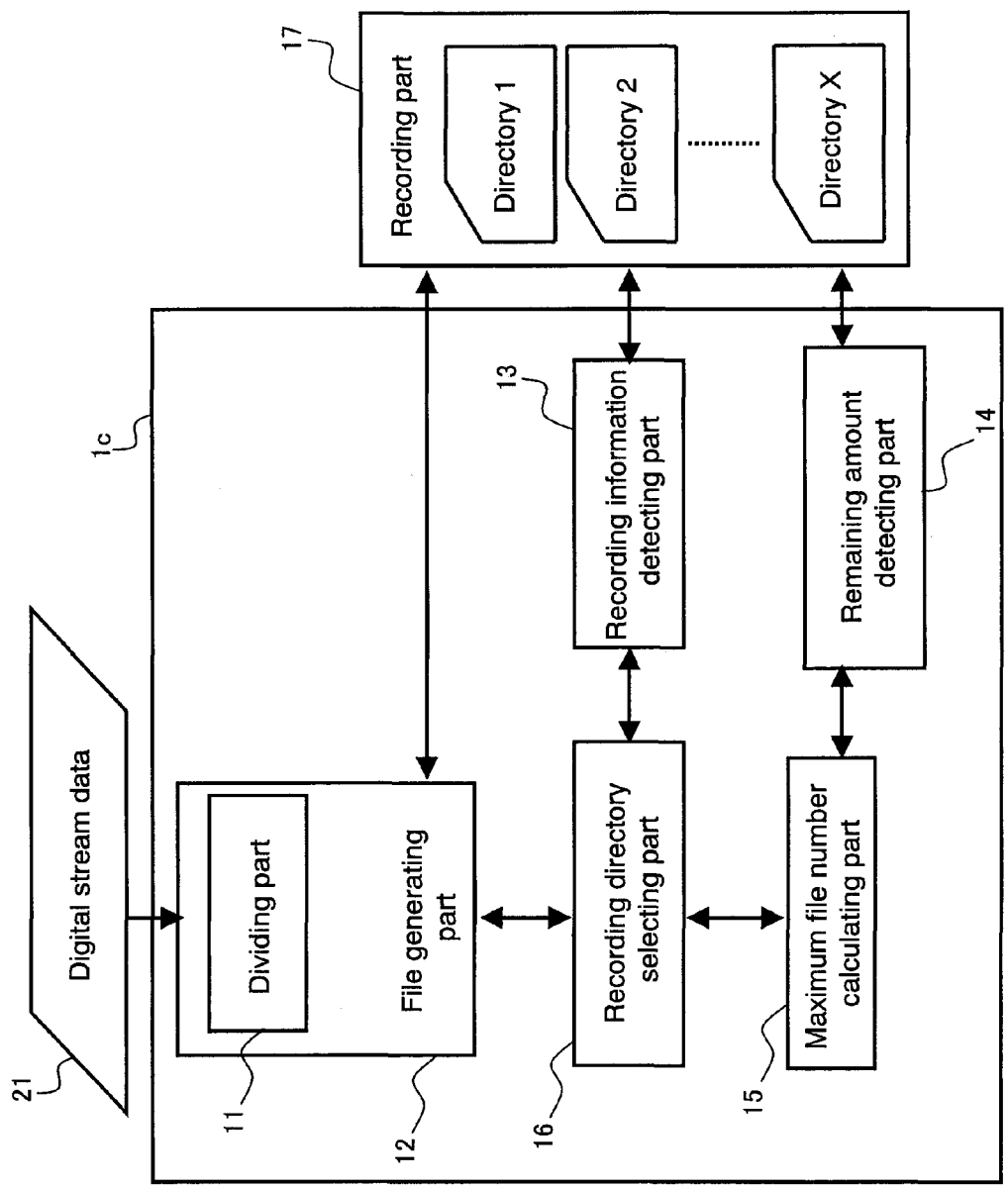
FIG. 20 is a block diagram showing a structure of a data recording system of Embodiment 6.

FIG. 20 is a block diagram showing a structure of a data recording system of the present embodiment. In FIG. 20, the data recording system 1c is provided with the file generating part 12 including a dividing part 11, a recording medium 17, a recording information detecting part 13, a remaining amount detecting part 14, a maximum file number calculating part 15 and a recording directory selecting part 16. Moreover, the data recording system 1c is connected with the recording medium 17.

The dividing part 11 divides the input digital stream data 21 into data files such that a size of the one data file is equal to or less than a file size limitation value M. The file generating part 12 records the data files into a recording directory that is selected by the recording directory selecting part 16. The recording information detecting part 13 detects a file number N in the directory that is recorded in the recording medium 17. The remaining amount detecting part 14 detects a remaining amount K of the recording medium 17. The maximum file number calculating part 15 calculates the maximum data file number J that can be obtained by the division in one recording, from the remaining value K detected by the remaining amount detecting part 14 and the file size limitation value M of one data file. The recording directory selecting part 16 selects the recording directory for recording the data files, from the file number N in the directory that is detected by the recording information detecting part 13 and the maximum data file number J that is calculated by the maximum file number calculating part 15.

In the data recording system 1c of the present embodiment, a maximum data file number that can be recorded in one directory is predetermined. In the case of recording the plurality of the data files that are generated by dividing the digital stream data 21, the recording directory selecting part 16 selects a directory in which the file number does not exceed the maximum data file number as the recording directory.

Figure 21:
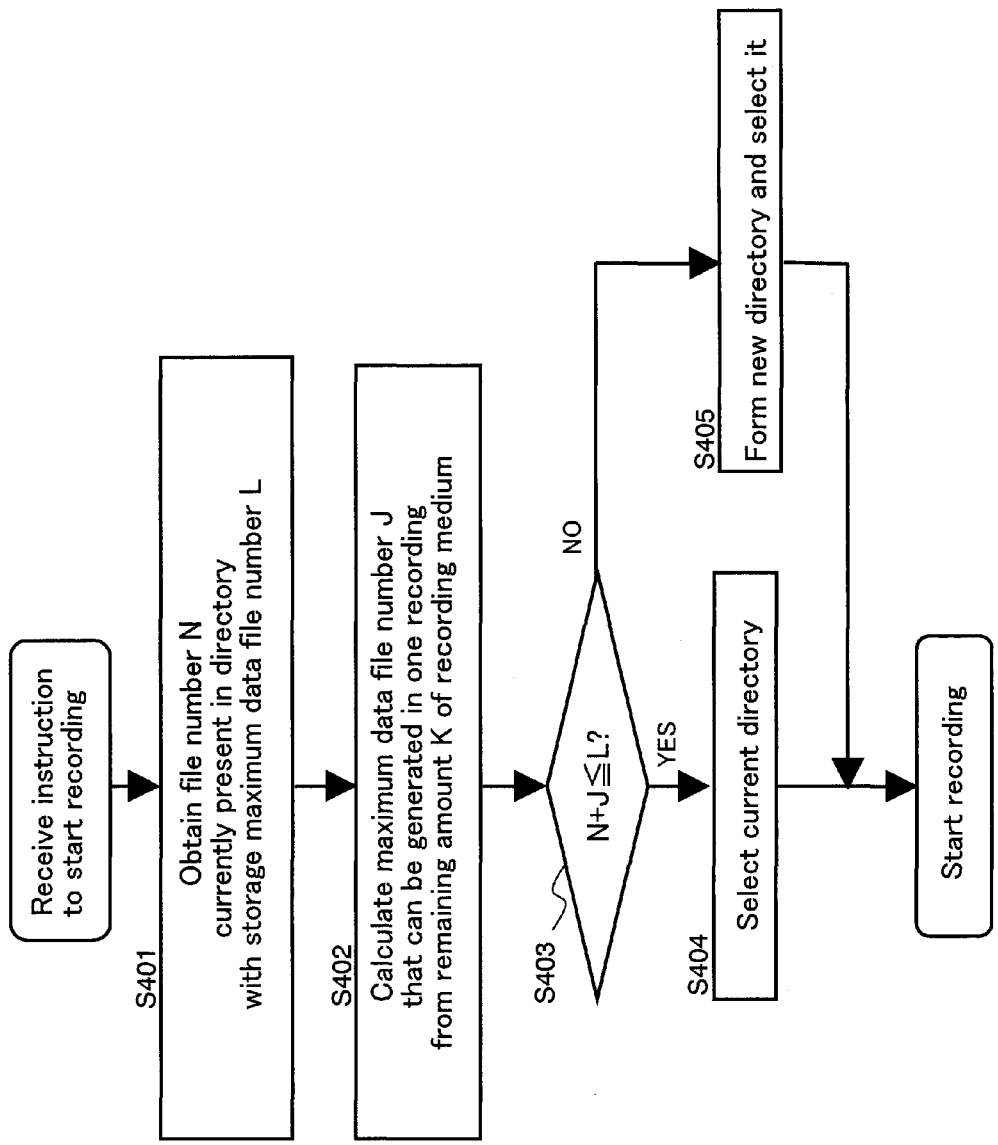
FIG. 21 is a flow chart showing an example of an operation of the data recording system of Embodiment 6.

An operation of the data recording system 1c of the present embodiment that is structured as described above will be explained with reference to FIG. 21.

In Step S401, the recording information detecting part 13 detects information of the recording medium 17, and obtains the number N of the data files that currently are present in the directory (the maximum data file number that can be recorded in the directory is denoted by L) into which the data files are to be recorded. In Step S402, the maximum file number calculating part 15 calculates a maximum data file number J that can be generated by next one recording of the digital stream data, from the remaining amount K of the recording medium 17 that is detected by the remaining amount detecting part 14 and the file size limitation value M of one data file. In Step S403, the recording directory selecting part 16 judges whether a sum (N+J) of the file number N of the directory for recording the data files and the maximum data file number J is equal to or less than the maximum data file number L or not.

In the case where the value (N+J) is equal to or less than the value L in Step S403, even if the file generating part 12 starts to record the digital stream data 21 and a plurality of data files are generated, all of the plurality of these data files can be recorded into the directory, so that the directory remains selected (Step S404).

On the other hand, in the case where the value (N+J) is more than the value L in Step S403, if the file generating part 12 starts to record the digital stream data 21 and a plurality of data files are generated, it may be possible for all of the plurality of these data files to be recorded into the directory for recording these data files. Thus, the recording directory selecting part 16 forms a new directory in the recording medium 107, and selects the new directory as the recording directory (Step S405).

Since the recording directory is determined before starting the recording as above, the file generating part 12 starts to record the divided data files that are divided by the dividing part 11 into the recording directory.

Figure 22:
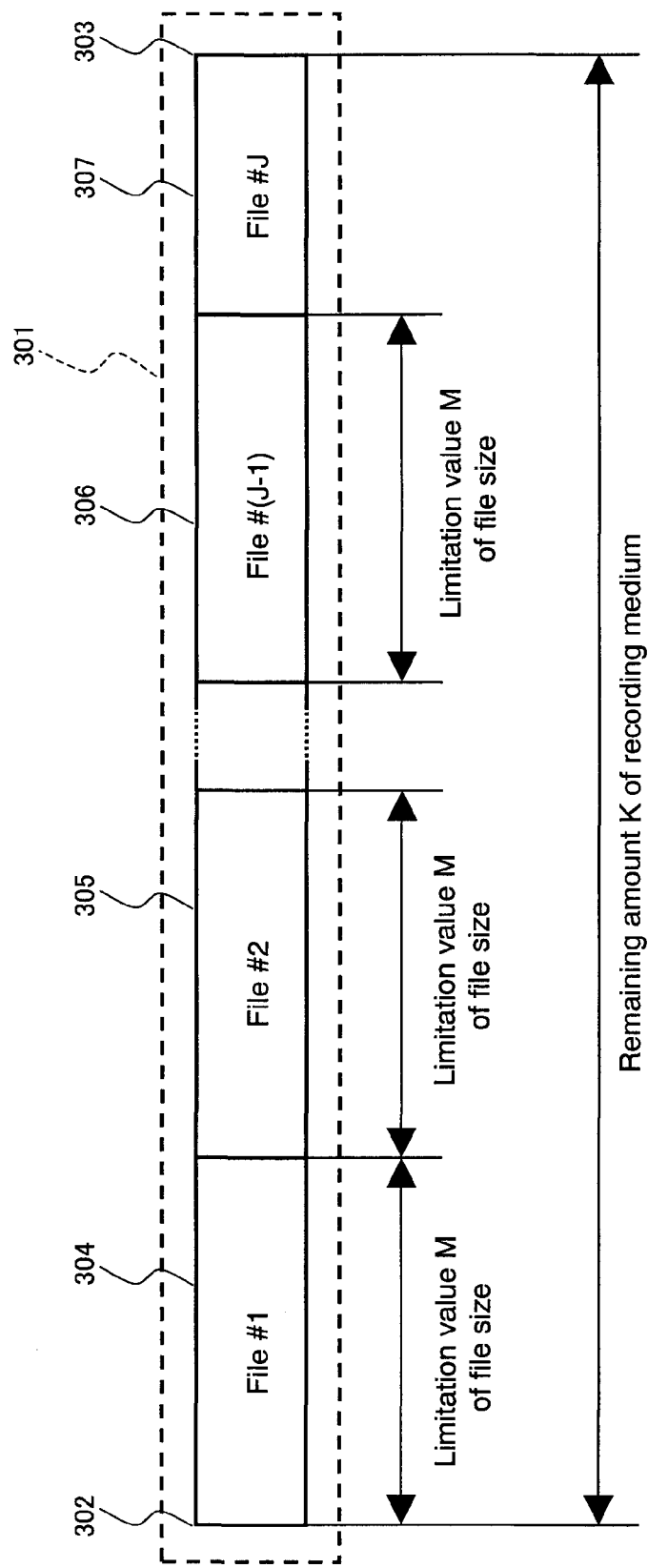
FIG. 22 is a view for explaining an operational example of a maximum file number calculating part 15.

Here, an operational example of the maximum file number calculating part 15 will be explained with reference to FIG. 22. FIG. 22 is a view for showing an example where the digital stream data is divided. In this example, in the case where the digital stream data 301 is recorded, the digital stream data 301 is divided into a plurality of data files 304 to 307 and then recorded. During the recording of one sequential digital stream data, a size of the recorded digital stream data becomes maximum in the case of receiving a recording ending instruction due to the emptiness of the remaining amount of the recording medium. In this case, a size of the one sequential digital stream data 301 that is sequential from the recording starting instruction receiving point 302 to the recording ending instruction receiving point 303 becomes the remaining amount K of the recording medium. Moreover, data files 304 to 306 before the data file 307 including the recording ending instruction receiving point 303 are divided according to the file size limitation value M of one file, so that a file size of each file is equal to the limitation value M. Moreover, a file size of the data file 307 including the recording ending instruction receiving point 303 is equal to or less than the file size limitation value M of one file. Thus, the maximum data file number J that can be generated in the recording of one digital stream data is a value that is obtained by rounding up, under a decimal point, a value obtained by dividing the remaining amount K by the file size limitation value M of one file. As described above, the maximum data file number J that can be divided by the next one recording can be calculated.

Figure 23:
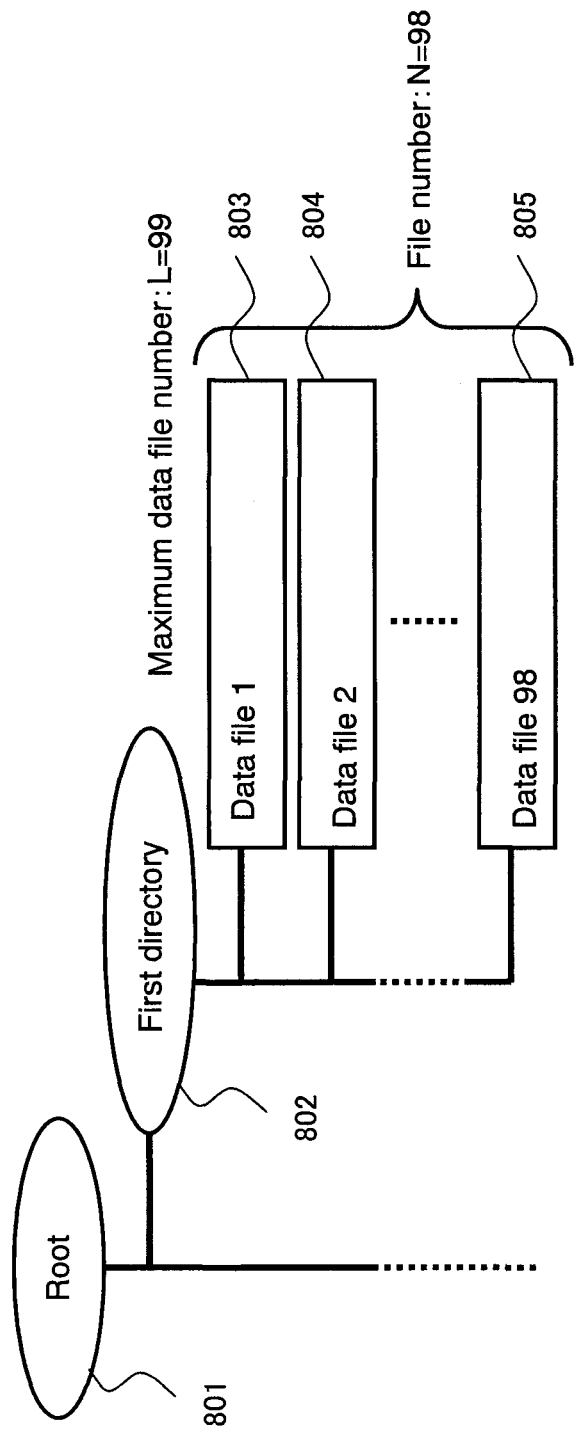
FIG. 23 is a view showing a state of a recording medium before a file generating part starts recording.
Figure 24:
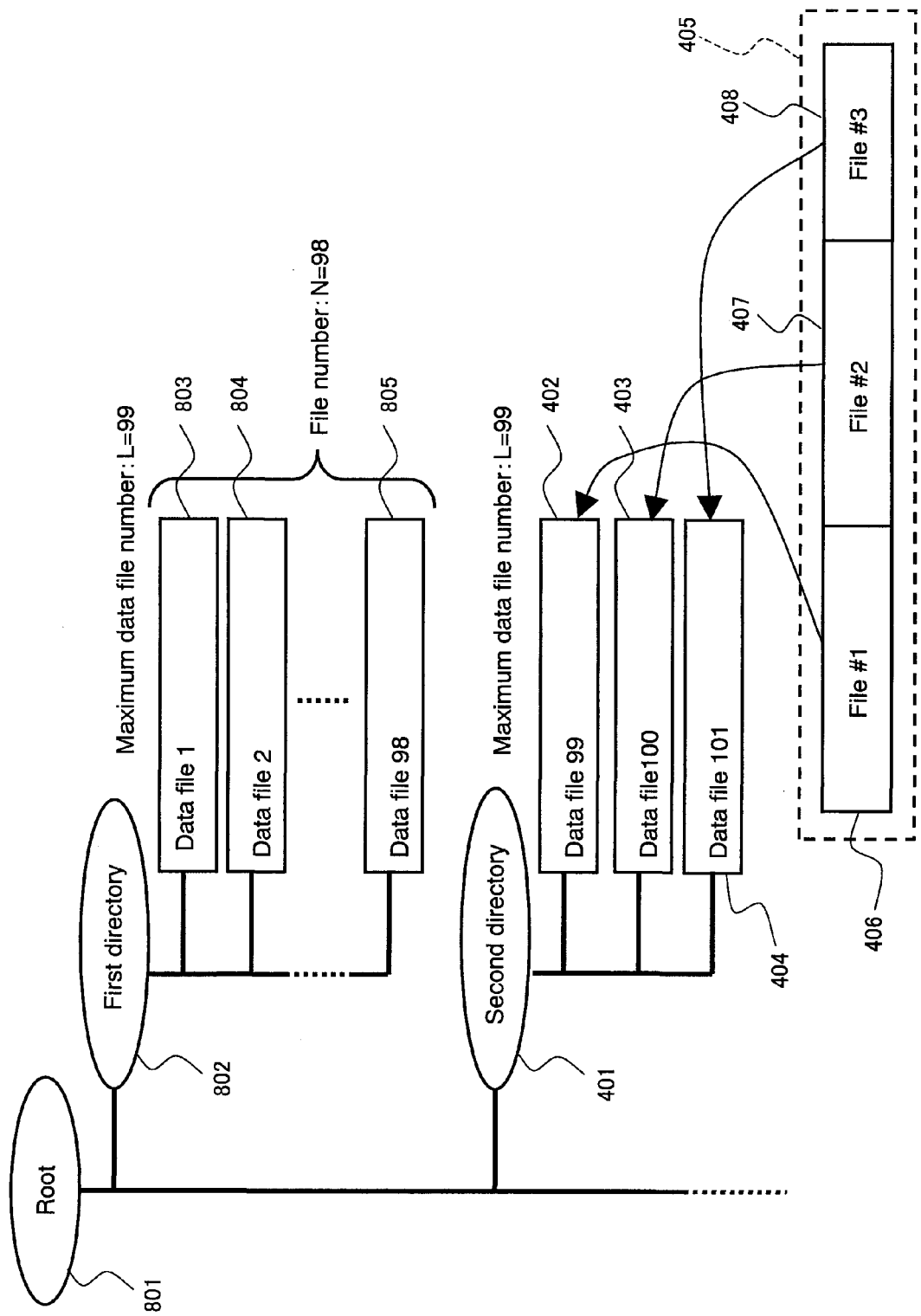
FIG. 24 is a view showing an example of the recording of data files by the data recording system of Embodiment 6.

A method for recording the data file by this data recording system 1c will be explained with reference to FIGS. 23 and 24. A state of the recording medium 17 before starting the recording by the file generating part 12 is shown in FIG. 23. A maximum data file number L of a first directory 802 is 99. When the file generating part 12 receives the recording starting instruction, the recording information detecting part 13 obtains the file number N of 98 of the first directory 802 from the recording medium 17, and the remaining amount detecting part 14 obtains the remaining amount K. Then, the maximum file number calculating part calculates the maximum data file number J that can be generated by the recording of the one digital stream data. At this time, in the case where the value (N+J) is more than the value L, all of the data files that are divided when the one sequential stream is divided into the plurality of the data files may not be recorded into the first directory 802. Thus, the recording directory selecting part 16 newly forms a second directory 401 as shown in FIG. 24, and records the data files into the directory.

For example, in the case where the one sequential digital stream data 405 is divided into three data files 406 to 408, the file generating part 12 records them not into the first directory 802 but into the second directory 401. As described above, all of the data files 406 to 408 that are generated from the one sequential digital stream data 405 can be recorded into the same directory (the second directory 401). Thus, when the user manages the one sequential digital stream data 405, he/she is required to refer only to the second directory 401, thereby improving the convenience for the user.

Incidentally, the values such as L=99, N=98 and the like are just the values used for explaining the present embodiment, and they are not limited to these values.

Moreover, in the present embodiment, for selecting the recording directory, the recording directory selecting part 16 compares the sum (N+J) of the file number N of the directory for recording the data files with the maximum data file number J that can be divided in one recording with the maximum data file number L, but may compare the value (N+J) with an arbitrary value that is equal to or less than the value L. For example, in the case of recording the files with an allowance of two files compared with the maximum data file number L into the directory, the recording directory selecting part 16 selects the recording directory by comparing not the value L but a value (L−2) with the value (N+J).

Moreover, in the present embodiment, if structuring by limiting the stream not only to the video image stream, but also to the audio stream or both of the video image stream and the audio stream, it can be processed by the dividing part 11 and the recording medium 102 of the present embodiment.

Figure 25:
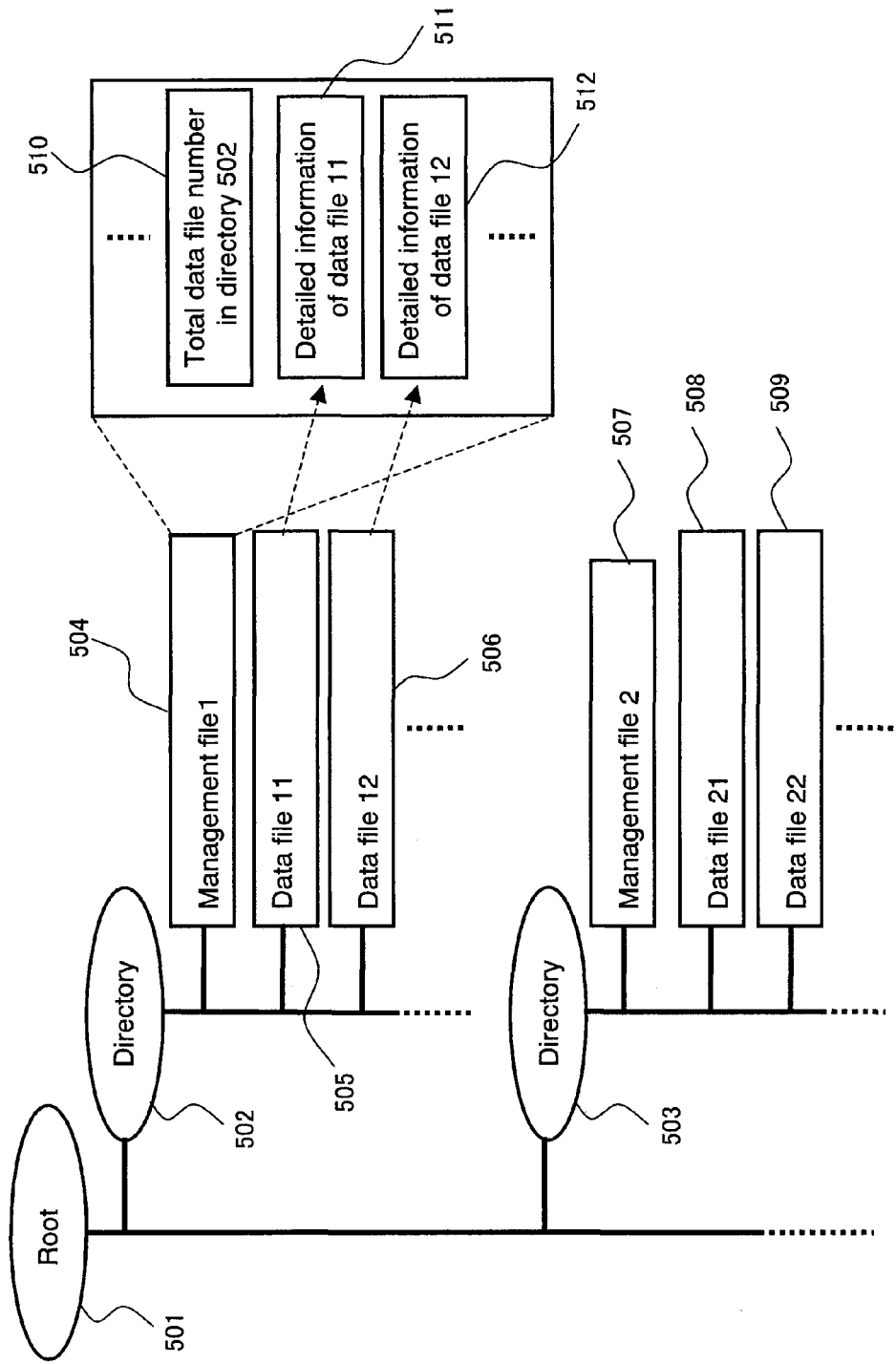
FIG. 25 is a view showing an example of a case where a directory management information file and other files exist.

Moreover, the present embodiment has provided the directory structure that includes only the directories and the data files as shown in FIG. 24, but the directory management information file that stores the information of each directory and other files may exist. For example, as shown in FIG. 25, under a directory 502, a directory management information file 504 that stores information relating to data files 505, 506 recorded in the directory 502 can be recorded. Further, under the directory 503, a directory management information file 507 that stores information relating to data files 508, 509 recorded in the directory 503 may be recorded.

Alternatively, it is possible to adopt a method in which a directory for the management file is formed under a root directory 501, and this directory performs unified management with respect to the directory management information file of each directory. Also, it is possible to adopt a method utilizing a method of forming the management-file directory and a method of recording the directory management information file in each directory in combination. A method for utilizing the directory management information files 504, 507 is considered to be as follows. If a total number 510 of the data files in the directory is recorded in the directory management information files 504, 507, the total number 510 can be utilized in the case where the recording information detecting part 13 obtains the number N of the data files that currently are present in the directory for recording the data Me. Thus, the data recording system can be achieved more easily.

Moreover, as information 511, 512 of the respective data files that are recorded into the directory management information files 504, 507, a flag for showing a relationship with other data files that are effective only in the same directory, for example, a flag for instructing to combine the reproduction seamlessly can be recorded. By utilizing this flag, it becomes easy to reproduce seamlessly with the previous data Me. Thus, in the present embodiment, even in the case where the stream is divided into the plurality of the data files, the data files can be recorded into the same directory, so that not only the management of the data files by the user but also the seamless reproduction of a sequence of the plurality of the data files are facilitated.

Moreover, in the present embodiment, the recording medium is not described specifically, but is not limited particularly, and may be a semiconductor memory, an optical disk, an optical magnetic disk, a magnetic disk or the like.

Moreover, needless to say, at least a part of the data recording system and the data recording method of the present embodiment can be realized by software that can be executed in a hardware resource such as a central processing unit (CPU) and a memory.

Embodiment 7

Figure 26:
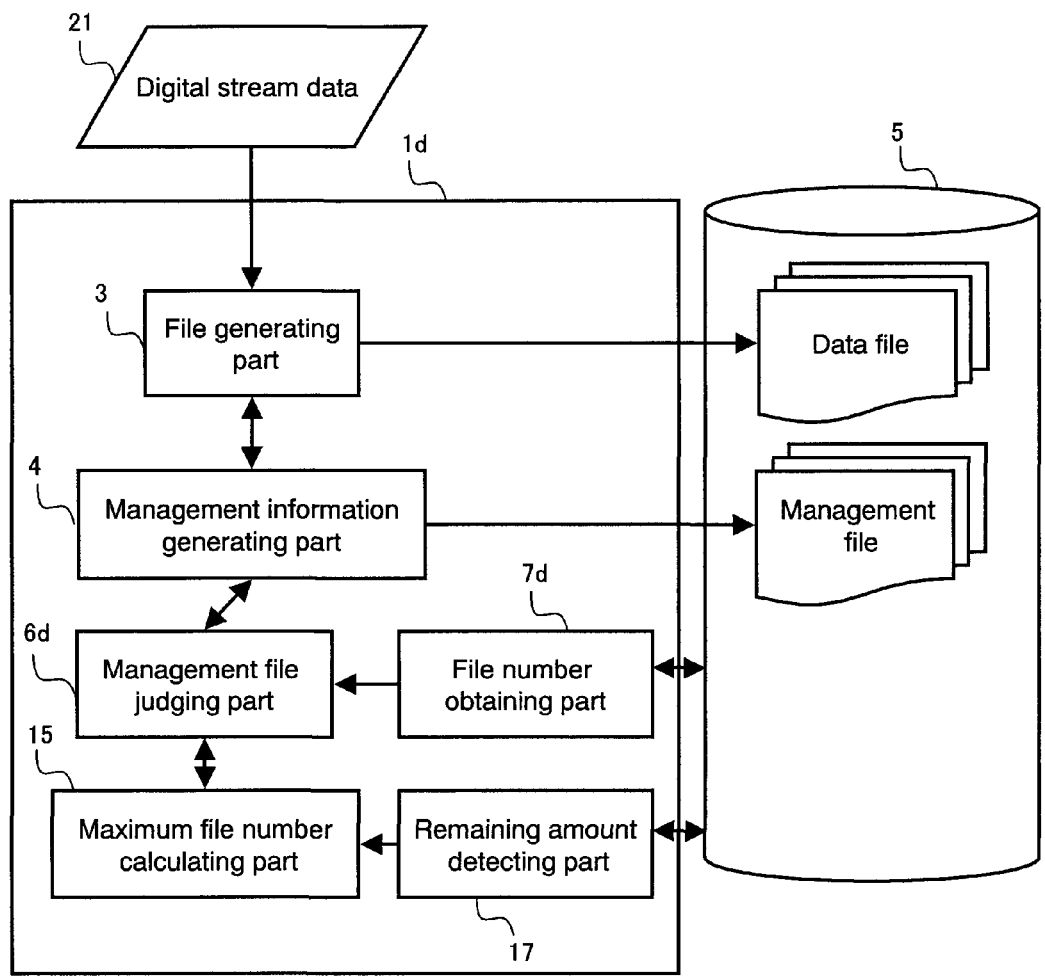
FIG. 26 is a functional block diagram showing a structure of a data recording system of Embodiment 7.

FIG. 26 is a functional block diagram showing a structure of a data recording system of the present embodiment. In FIG. 26, functional blocks that are the same as the functional blocks shown in FIG. 1 are denoted by the same reference numerals, and explanation thereof will be omitted. As shown in FIG. 26, the data recording system 1d is provided with the file generating part 3, the management information generating part 4, a management file judging part 6d, a file number obtaining part 7d, a maximum file number calculating part 9 and the remaining amount detecting part 14. The data recording system 1 is connected with the recording medium 5.

The file number obtaining part 7 obtains the number of the data files that are managed by at least one management file among the management files recorded in the recording medium 5. The remaining amount detecting part 14 detects a remaining amount K of the recording medium 5. The maximum file number calculating part 15 has a function similar to the function of the maximum file number calculating part 15 shown in FIG. 20. That is, the maximum value J of the data file number that can be taken in the case of dividing the digital stream data into the plurality of the data files and recording them into the remaining amount K, from the remaining amount K and the limitation value M of the file size of the data file.

The management file judging part 6d determines a management file for storing the management information based on the number of the data files that are managed by the management file obtained by the file number obtaining part 7d and the maximum value J of the data file number calculated by the maximum file number calculating part 15.

More specifically, the management file judging part 6d determines, as the storing management file of the management information, a management file in which the sum of the number of the data files obtained by the file number obtaining part 7d and the maximum value J is equal to or less than the maximum data file number L that can be managed in one management file. In the case where such a management file is not present in the recording medium 5, a management file newly is formed, and is determined as the storing management file.

In the present embodiment, structures of directories for recording the management file and the data file are the same as those of Embodiment 3 described above. That is, a management-file directory and a data-file directory are provided respectively. The present embodiment will provide a case where the directory structure of the recording medium 5 is the same as the directory structure shown in FIG. 10.

Figure 27:
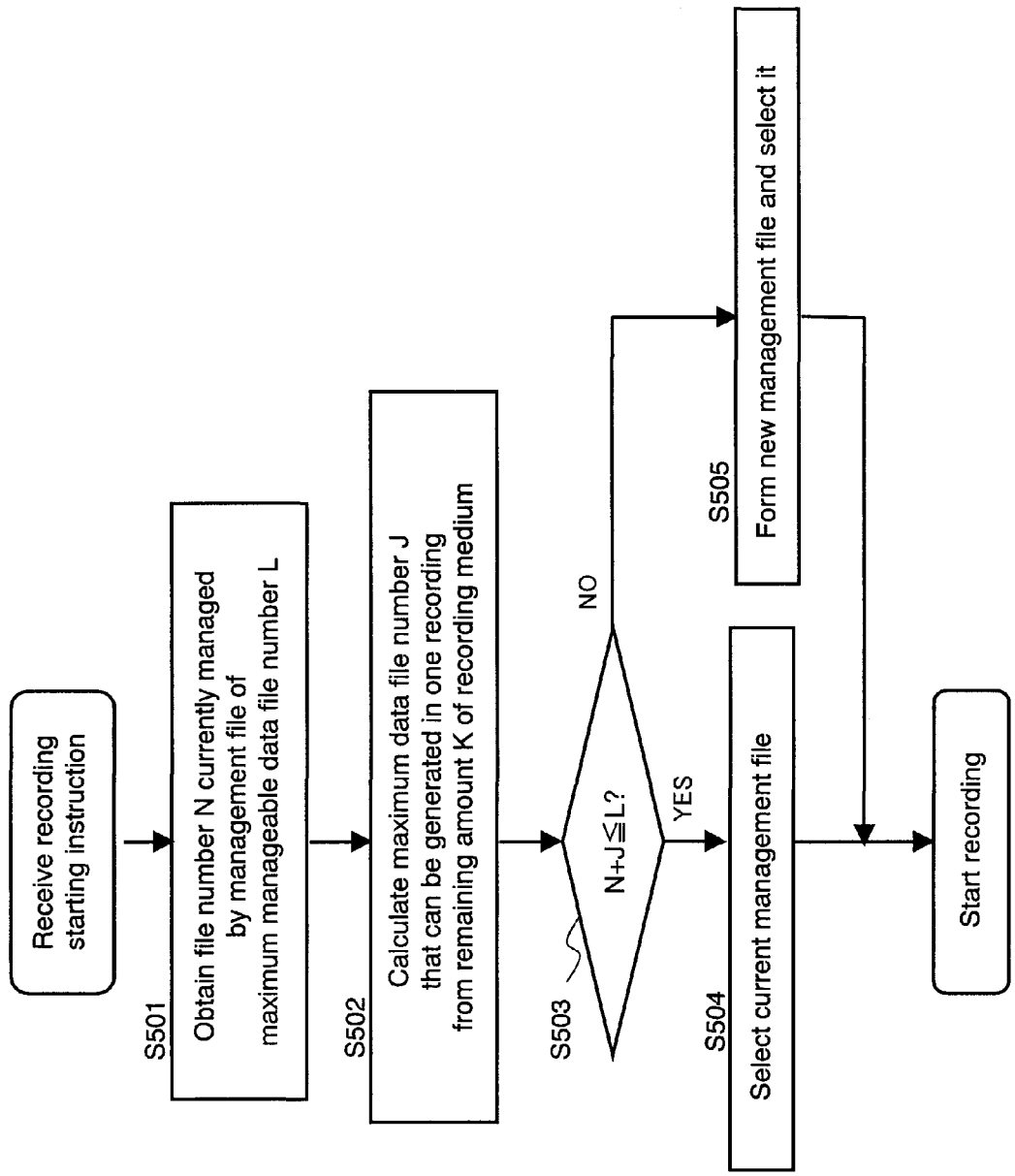
FIG. 27 is a flow chart showing an example of an operation of the data recording system of Embodiment 7.

Next, an example of an operation of the data recording system 1d of the present embodiment for determining the management file before dividing and recording the digital stream data 21 will be explained. FIG. 27 is a flow chart showing an example of the operation of the data recording system 1d. The operation shown in FIG. 27 is an example of an operation of the management file judging part 6d for determining the storing management file in the directory structure shown in FIG. 10.

In Step S501, the file number obtaining part 7d obtains the number (N) of the data files managed by each management file (herein, a first management file 33 is exemplified) that is already recorded in the management-file directory 41. Incidentally, processing of the file number obtaining part 7 is similar to the processing of Step S203 in FIG. 14.

In Step S502, the maximum file number calculating part 15 calculates the maximum data file number J that can be generated in the recording of the digital stream data 21, from the remaining amount K of the recording medium 5 that is detected by the remaining amount detecting part 14 and the file size limitation value M of one data file. Here, the maximum data file number J can be calculated similarly to the calculating method shown in Embodiment 6.

In Step S503, the management file judging part 6d judges whether a sum (N+J) of a file number N of the data files managed by the first management file 33 and the maximum data file number J is equal to or less than the manageable maximum data file number L or not.

In the case where the value (N+J) is equal to or less than the value L in Step S503, since all of the plurality of the data files generated from the digital stream data 21 by the file generating part 12 can be recorded into the directory, the management file judging part 6d continues to select the first management file 33 as the recording management file (Step S504).

On the other hand, in the case where the value (N+J) is more than the value L in Step S503, it may be impossible to store all of the management information of the plurality of the data files generated from the digital stream data 21 by the file generating part 12 into the first management file 33. Thus, the management file judging part 6d newly forms a second management file 52 in the management-file directory 41, and selects this second management file 52 as the storing management file of the management information (Step S505).

Since the storing management file of the management information is determined as above, the file generating part 3 starts to record the data files generated by dividing the digital stream data into the data-file directory 42.

The management information generating part 4 stores the management information of the data file into the management file that is determined by the management file judging part 6d. As an example, a directory structure after the management information of the data files recorded by the file generating part 3 is stored into the second management file 52 is similar to the directory structure shown in FIG. 12. As described above, the data recording system 1d of the present embodiment can be managed in the same management file, by dividing the digital stream data 21 into the plurality of the data files.

As described above, Embodiments 1 to 7 have referred to the data recording system of the present invention, but the present invention is not limited to the above-described embodiments.

The data recording system according to above-described Embodiments 1 to 7 can be used for a system that divides, for example, AV (Audio Video) stream data that is photographed sequentially by a digital video camera into a plurality of AV stream data files and records them into a recording medium. In this case, management information of the data files stored into the management file may include, for example, a reproducing section of an AV stream, an AV data attribution (for example, a video image size or the like) included in the AV stream, a data map of the AV stream data file and the like. Here, the data map is information showing, for example, that certain data of certain time is located in a certain place or the like. According to such information, when reproducing the data files of the AV stream that are divided and recorded, an AV data attribution can be detected without decoding the AV stream. Also, midcourse replay of the AV stream data from its midway and high-speed replay by reproducing only separate sections of the AV stream data become possible. Moreover, the additional management information as described above may be stored in a file that is provided corresponding to the management file by 1:1.

Incidentally, the above-described embodiments have provided the case where the predetermined maximum data file number that can be recorded in the first directory 32 is 99, and the number of the data files that are already recorded in the first directory 32 is 98, but they are just the values used for explaining the above-described embodiments, and the data file numbers are not limited to those values.

Moreover, there are many cases where the predetermined maximum file size of one file is determined not only by limitation of an adopted file system (FAT32 or the like), but also by limitation of the apparatus, by limitation of an applied standard, by designation of a user and the like.

Further, there also are many cases where the predetermined maximum data file number that can be recorded in the directory is determined not only by limitation of an adopted file system (FAT32 or the like), but also by limitation of the apparatus, by limitation of an applied standard, by designation of a user and the like.

Moreover, in the above-described embodiments, the digital stream data 21 is divided into the plurality of the data files when its size reaches the predetermined maximum file size of one file, but the present invention is not limited to the case where the digital stream data 21 is divided at the predetermined maximum file size. For example, in the case where the digital stream data has a format of MPEG2, it is easier and convenient to manage it if dividing the data file on a boundary of a GOP (Group of Picture). That is, when reproducing the data files obtained by dividing the MPEG2 data immediately before a top of the GOP, the data of the MPEG2 is decoded easily. Thus, for example, the data file also can be divided on a boundary of the GOP so as to provide a file size that is the largest possible so as not to exceed the predetermined maximum file size.

Moreover, the digital stream data 21 of the present embodiment is not limited to the video image data, and may be audio data or both of the video image data and the audio data.

Further, the above-described embodiments have provided the case where the information for managing the order of recording the data files that are recorded in the directory is recorded in the table format in the management file, but the information for managing the recording order is not limited to such a table format.

In the case where the data recording system of the present invention divides the digital stream data into the plurality of the data files and records them, it can record such that the management of the plurality of the recorded data files is easy, and thus it is useful for a system, an apparatus or the like that has a function of recording digital stream data.

Figure 28:
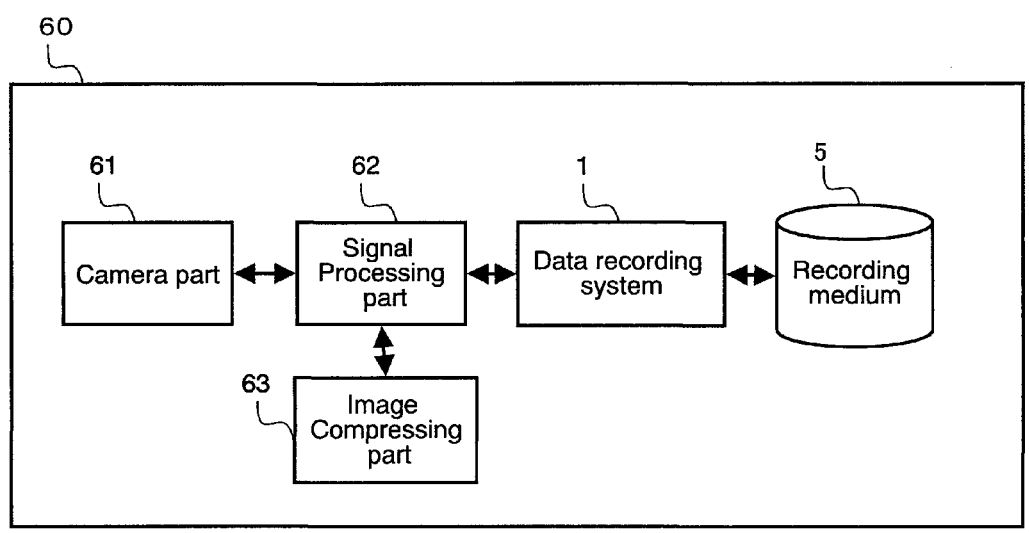
FIG. 28 is a functional block diagram showing a structure of photographing equipment on which the data recording system is mounted.
Figure 29:
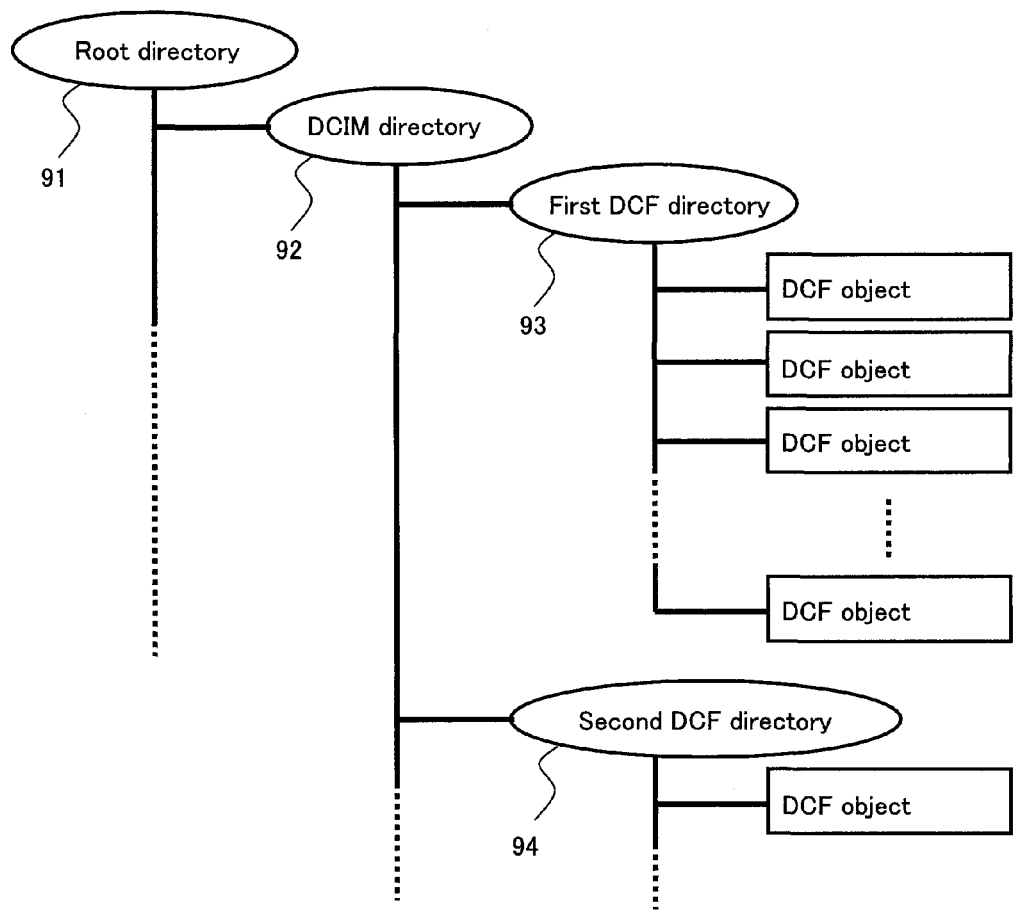
FIG. 29 is a view showing a directory structure of a DCF.
Figure 30:
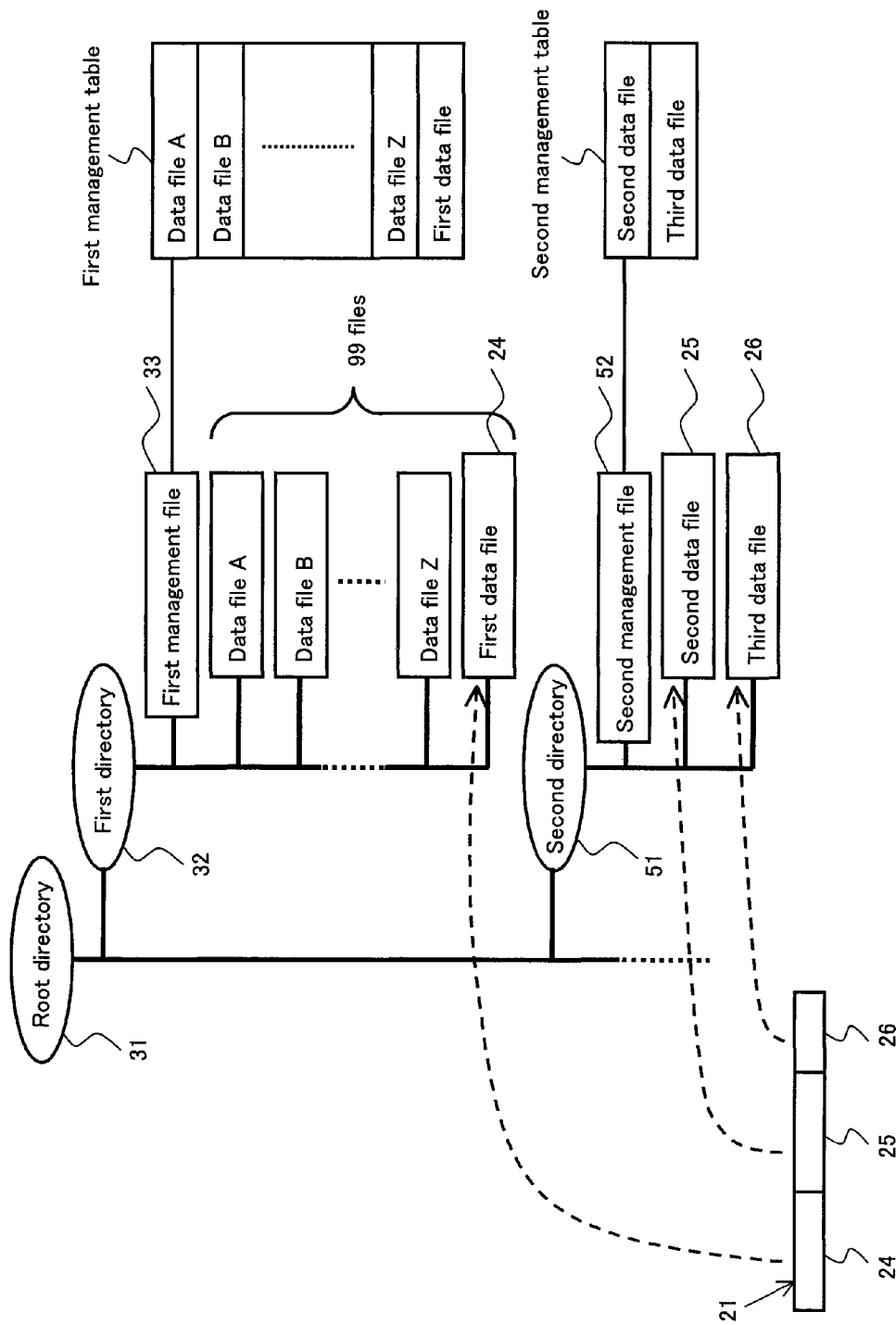
FIG. 30 is a view showing an example of a case of recording divided data files into a directory.

An example of an apparatus to which the data recording system is applied will be shown below. FIG. 28 is a functional block diagram showing a structure of photographing equipment on which the data recording system 1 of Embodiment 1 is mounted. Photographing equipment 60 shown in FIG. 28 is, for example, a digital video camera that can pick up moving images. A camera part 61, a signal processing part 62, an image compressing part 63, a data recording system 1 and the recording medium 5 are provided. The camera part 61 picks up incident optical images. The camera part 61 is provided with, for example, a lens constituted of a focus lens, a zoom lens or the like, a diaphragm for controlling an optical amount of the incident optical image, and an imaging device for forming the incident optical images and converting them into electric signals (for example, a CCD image sensor, a CMOS image sensor or the like).

The image processing part 62 generates a video image signal based on the electric signal that is output from the camera part 61. The signal processing part 62 performs image signal processing, for example, noise canceling, gamma correction and the like. The image compressing part 63 performs image compression processing for reducing a data amount of the video image signal generated by the signal processing part 62. An example of the image compression processing is a compressing method that comply with a MPEG (Moving Picture Experts Group) format in the case of moving images. The signal processing part 62 outputs, as digital stream data, the video image signal that is subjected to the compression processing by the image compressing part 63. The digital stream data output from the signal processing part 62 is transferred to the data recording system 1 sequentially. The data recording system 1 records the digital stream data into the recording medium 5 as described in the above embodiments. Thereby, the digital stream data is recorded into the recording medium 5 as a data file in a format that can be managed easily. The recording medium 5 may be, for example, a removable memory that can be attached/detached with respect to the photographing equipment 60, and also may be a fixed memory such as a hard disk, which is fixed to the photographing equipment 60. In the case of using the removable memory, for example, a nonvolatile semiconductor memory such as a SDRAM (Synchronous Dynamic Random Access Memory) can be integrated in a thin case on a card.

Incidentally, the functional block of the photographing equipment 60 is not limited to the functional block shown in FIG. 28. For example, the photographing equipment 60 may be provided with a reproducing part for reproducing a data file that is recorded in the recording medium 5, a displaying part for displaying a reproduced video image and the like. Moreover, the equipment in which the data recording system of the present invention is mounted is not limited to the photographing equipment 60. For example, in a general computer such as a server machine and a personal computer, the data recording system of the present invention can be applied also to a system for recording digital stream data that is input via networks into a recording medium or the like.

The invention claimed is:

1. A data recording system including a non-transitory computer-readable recording medium for dividing continuous digital data into a plurality of data files and recording the plurality of the data files into the recording medium, the data recording system comprising:
a file generating part for dividing the continuous digital data so as to generate the plurality of the data files and recording the plurality of the data files sequentially into the recording medium, in parallel with continuously reading of the digital data;
a management file judging part for determining one management file that stores management information for managing the plurality of the data files;
a management information generating part for adding the management information including information that shows a recording order of the plurality of the data files into the management file determined by the management file judging part;
a file number obtaining part for obtaining the number of data files that are managed by at least one management file among the management files recorded in the recording medium;
a remaining amount detecting part for detecting a remaining memory capacity K of the recording medium; and
a maximum file number calculating part for calculating, based on the remaining memory capacity K and a limitation value M defining a maximum possible file size of one data file, a maximum value J of the data file number that can be taken in a recording of the continuous digital data in the case of dividing the continuous digital data into a plurality of data files and recording the plurality of the data files into the remaining memory capacity K,
wherein the management file judging part determines the management file for storing the management information such that the sum of the number of the data files managed by the management file that is obtained by the file number obtaining part and the maximum value J of the data files, when adding the management information of the plurality of the data files into the management file, does not exceed a maximum data file number L (L is a natural number) that is the number of data files that can be managed by the management file;
wherein when the summation determined by the management file judging part does not exceed the maximum data file number L, the plurality of data files are stored within a same directory.

2. The data recording system according to claim 1, wherein the management file is provided so as to correspond to each of the directories on the recording medium, and
the maximum data file number L that is the number of data files that can be managed by the management file is equal to the maximum data file number that is the number of data files that can be recorded into each corresponding directory,
the data recording system further comprising:
a recording directory selecting part for determining a directory corresponding to the management file that is determined by the management file judging part as the directory for recording the plurality of the data files,
wherein the file generating part records the plurality of the data files into the directory that is selected by the recording directory selecting part.

3. The data recording system according to claim 1, wherein the management file judging part determines, as the management file for storing the management information, a management file in which sum of the number of the data files managed by the management file that is obtained by the file number obtaining part and the maximum value J of the data files is equal to or less than the maximum data file number L.

4. The data recording system according to claim 1, wherein, in the case where the management file in which sum of the number of the files obtained by the file number obtaining part and the maximum value J of the data files is equal to or less than the maximum data file number L is not present, the management file judging part newly forms a management file, and determines the formed management file as the management file for storing the management information.

5. The data recording system according to any one of claim 1, wherein, in the case where a maximum file size that can be taken by one file is predetermined and a size of the continuous digital data exceeds the maximum file size, the file generating part divides the continuous digital data into a plurality of files having a size that is equal to or less than the maximum file size.

6. The data recording system according to claim 1, wherein the file generating part starts to record the data files generated by dividing the digital stream data into the recording medium after the management file judging part determines the management file for storing the management information of the plurality of data files.

7. A data recording system including a non-transitory computer-readable recording medium for dividing continuous digital data into a plurality of data files and recording the plurality of the data files into the recording medium, the data recording system comprising:
a file generating part for dividing the continuous digital data so as to generate the plurality of the data files and recording the plurality of the data files sequentially into the recording medium, in parallel with continuously reading of the digital data;

a management file judging part for determining one management file that stores management information for managing the plurality of the data files; and a management information generating part for adding the management information including information that shows a recording order of the plurality of the data files into the management file determined by the management file judging part, wherein the management file judging part determines the management file for storing the management information such that, when adding the management information of the plurality of the data files into the management file, the number of the data files managed by the management file does not exceed a maximum data file number L (L is a natural number) that is the number of data files that can be managed by the management file, when the number of data files managed by the management file reaches the maximum data file number L when management information of first to Nth (N is a natural number) data files among the plurality of the data files are added into the management file, the management file judging part changes the management file for storing the management information into another management file that is different from the management file, and the management information generating part moves the management information of the first to Nth data files into the another management file, and adds management information of (N+1)th and greater data files into the another management file.

8. The data recording system according to claim 7, wherein the management information includes records containing information relating to the data files to be managed, each of the records relating to each of the data files, the management information generating part adds a plurality of the records showing the plurality of the data files in an order of recording the plurality of the data files as the management information into the management file, in the case where the number of data files managed by the management file reaches the maximum data file number L when the management information of the first to Nth (N is a natural number) data files are added into the management file, the management file judging part changes the management file for storing the management information into the another management file that is different from the management file, and the management information generating part reserve area of N records for the another management file, adds the records that respectively correspond to the (N+1)th and greater data files into the management file sequentially when the (N+1)th and greater data files are recorded into the recording medium, and adds the records that correspond to the first to Nth data files into the reserve area during or after the recording.

9. The data recording system according to claim 7, wherein the management file judging part determines a newly formed management file as the another management file.

10. A data recording system including a non-transitory computer-readable recording medium for dividing continuous digital data into a plurality of data files and recording the plurality of the data files into the recording medium, the data recording system comprising:

a file generating part for dividing the continuous digital data so as to generate the plurality of the data files and recording the plurality of the data files sequentially into the recording medium, in parallel with continuously reading of the digital data;

a management file judging part for determining one management file that stores management information for managing the plurality of the data files; and a management information generating part for adding the management information including information that shows a recording order of the plurality of the data files into the management file determined by the management file judging part, wherein the management file judging part determines the management file for storing the management information such that, when adding the management information of the plurality of the data files into the management file, the number of the data files managed by the management file does not exceed a maximum data file number L (L is a natural number) that is the number of data files that can be managed by the management file, the management file is provided so as to correspond to each directory on the recording medium, each of the management files includes management information of a data file in each corresponding directory, the file generating part records the plurality of the data files into the directories on the recording medium, the management information generating part adds the management information of the data file recorded in the directory into the management file that is provided so as to correspond to the directory, when the number of data files recorded into the directory reaches the maximum data file number L that is the number of data files that can be recorded in the directory when first to Nth (N is a natural number) data files among the plurality of the data files are recorded into the directory, the management file judging part changes the management file for storing the management information into another management file corresponding to another directory that is different from the directory, and the file generating part moves the first to Nth data files into the another directory and records (N+1)th and greater data files into the another directory.

11. A photographing apparatus comprising:

an imaging part for picking up an incident optical image;

a signal processing part for generating video image digital data from the optical image that is picked up by the imaging part;

a file generating part for dividing the continuous digital data that is generated by the signal processing part so as to generate a plurality of data files and recording the plurality of the data files sequentially into the recording medium;

a management file judging part for determining one management file that stores management information for managing the plurality of data files;

a management information generating part for adding the management information that includes information showing a recording order of the plurality of the data files into the management file determined by the management file judging part;

a file number obtaining part for obtaining the number of data files that are managed by at least one management file among the management files recorded in the recording medium;

a remaining amount detecting part for detecting a remaining memory capacity K of the recording medium; and a maximum file number calculating part for calculating, based on the remaining memory capacity K and a limitation value M defining a maximum possible file size of one data file, a maximum value J of the data file number that can be taken in a recording of the continuous digital data in the case of dividing the continuous digital data into a plurality of data files and recording the plurality of the data files into the remaining memory capacity K, wherein the management file judging part determines a management file for storing the management information such that the sum of the number of the data files managed by the management file that is obtained by the file number obtaining part and the maximum value J of the data files, when adding the management information of the plurality of the data files into the management file, does not exceed a maximum data file number L (L is a natural number) that is the number of data files that can be managed by the management file;

wherein when the summation determined by the management file judging part does not exceed the maximum data file number L, the plurality of data files are stored within a same directory.

12. A non-transitory recording medium storing a data recording program that allows a computer to execute processing for dividing continuous digital data into a plurality of data files and recording the plurality of the data files into a recording medium, the data recording program allowing the computer to execute:

file generating processing for dividing the continuous digital data so as to generate a plurality of the data files and recording the plurality of the data files sequentially into the recording medium;

management file judgment processing for determining one management file that stores the management information for managing the plurality of the data files;

management information generation processing for adding the management information including information showing a recording order of the plurality of the data files into the management file determined by the management file judgment processing;

file number obtaining processing for obtaining the number of data files that are managed by at least one management file among the management files recorded in the recording medium;

remaining amount detecting processing for detecting a remaining memory capacity K of the recording medium; and maximum file number calculating processing for calculating, based on the remaining memory capacity K and a limitation value M defining a maximum possible file size of one data file, a maximum value J of the data file number that can be taken in a recording of the continuous digital data in the case of dividing the continuous digital data into a plurality of data files and recording the plurality of the data files into the remaining memory capacity K, wherein the management file judgment processing is processing for determining a management file for storing the management information such that the sum of the number of the data files managed by the management file that is obtained by the file number obtaining processing and the maximum value J of the data files, when adding the management information of the plurality of the data files into the management file, does not exceed a maximum data file number L (L is a natural number) that is the number of data files that can be managed by the management file;

wherein when the summation determined by the management file judging part does not exceed the maximum data file number L, the plurality of data files are stored within a same directory.

13. A non-transitory recording medium storing a data recording program that allows a computer to execute processing for dividing continuous digital data into a plurality of data files and recording the plurality of the data files into a recording medium, the data recording program allowing the computer to execute:

file generating processing for dividing the continuous digital data so as to generate a plurality of the data files and recording the plurality of the data files sequentially into the recording medium;

management file judgment processing for determining one management file that stores the management information for managing the plurality of the data files; and management information generation processing for adding the management information including information showing a recording order of the plurality of the data files into the management file determined by the management file judgment processing, wherein the management file judgment processing is processing for determining a management file for storing the management information such that, when adding the management information of the plurality of the data files into the management file, the number of the data files managed by the management file does not exceed a maximum data file number L (L is a natural number) that is the number of data files that can be managed by the management file, when the number of data files managed by the management file reaches the maximum data file number L when management information of first to Nth (N is a natural number) data files among the plurality of the data files is added into the management file, the management file that stores the management information in the management file judgment processing is changed into another management file that is different from the management file, the management information of the first to Nth data files are moved into the another management file, and management information of (N+1)th and greater data files are added into the another management file in the management information generation processing.

14. A data recording method in which a computer divides continuous digital data into a plurality of data files and records the plurality of the data files into a recording medium, the data recording method comprising:

a file generating step for dividing the continuous digital data so as to generate the plurality of the data files and recording the plurality of the data files sequentially into the recording medium;

a management file judging step for determining one management file for storing management information for managing the plurality of the data files;

a management information generating step for adding the management information including information that shows a recording order of the plurality of the data files into the management file determined in the management file judging step;

a file number obtaining step for obtaining the number of data files that are managed by at least one management file among the management files recorded in the recording medium;

a remaining amount detecting step for detecting a remaining memory capacity K that can be recorded in the recording medium; and a maximum file number calculating step for calculating, based on the remaining memory capacity K and a limitation value M defining a maximum file size of one data file, a maximum value J of the data file number that can be taken in a recording of the continuous digital data in the case of dividing the continuous digital data into a plurality of data files and recording the plurality of the data files into the remaining memory capacity K, wherein the management file judging step comprises determining the management file for storing the management information such that the sum of the number of the data files managed by the management file that is obtained by the file number obtaining step and the maximum value J of the data files, when adding the management information of the plurality of the data files into the management file, does not exceed a maximum data file number L (L is a natural number) that is the number of data files that can be managed by the management file;

wherein when the summation determined by the management file judging part does not exceed the maximum data file number L, the plurality of data files are stored within a same directory.

15. A data recording method in which a computer divides continuous digital data into a plurality of data files and records the plurality of the data files into a recording medium, the data recording method comprising:

a file generating step for dividing the continuous digital data so as to generate the plurality of the data files and recording the plurality of the data files sequentially into the recording medium;

a management file judging step for determining one management file for storing management information for managing the plurality of the data files; and a management information generating step for adding the management information including information that shows a recording order of the plurality of the data files into the management file determined in the management file judging step, wherein the management file judging step comprises determining the management file for storing the management information such that, when adding the management information of the plurality of the data files into the management file, the number of the data files managed by the management file does not exceed a maximum data file number L (L is a natural number) that is the number of data files that can be managed by the management file, when the number of data files managed by the management file reaches the maximum data file number L when management information of first to Nth (N is a natural number) data files among the plurality of the data files are added into the management file, the management file judging step comprises changing the management file for storing the management information into another management file that is different from the management file, and the management information generating step comprises moving the management information of the first to Nth data files into the another management file, and adding management information of (N+1)th and greater data files into the another management file.

16. A photographing apparatus comprising:
an imaging part for picking up an incident optical image;
a signal processing part for generating video image digital data from the optical image that is picked up by the imaging part;
a file generating part for dividing the continuous digital data that is generated by the signal processing part so as to generate a plurality of data files and recording the plurality of the data files sequentially into the recording medium;

a management file judging part for determining one management file that stores management information for managing the plurality of data files;

a management information generating part for adding the management information that includes information showing a recording order of the plurality of the data files into the management file determined by the management file judging part, wherein the management file judging part determines a management file for storing the management information such that a data file number that is the number of data files that are managed by the management file when adding the management information of the plurality of the data files into the management file does not exceed the maximum data file number L (L is a natural number) that is the number of data files that can be managed by the management file, when the number of data files managed by the management file reaches the maximum data file number L when management information of first to Nth (N is a natural number) data files among the plurality of the data files are added into the management file, the management file judging part changes the management file for storing the management information into another management file that is different from the management file, and the management information generating part moves the management information of the first to Nth data files into the another management file, and adds management information of (N+1)th and greater data files into the another management file.

17. A photographing apparatus comprising:
an imaging part for picking up an incident optical image;
a signal processing part for generating video image digital data from the optical image that is picked up by the imaging part;
a file generating part for dividing the continuous digital data that is generated by the signal processing part so as to generate a plurality of data files and recording the plurality of the data files sequentially into the recording medium;

a management file judging part for determining one management file that stores management information for managing the plurality of data files;

a management information generating part for adding the management information that includes information showing a recording order of the plurality of the data files into the management file determined by the management file judging part, wherein the management file judging part determines a management file for storing the management information such that a data file number that is the number of data files that are managed by the management file when adding the management information of the plurality of the data files into the management file does not exceed the maximum data file number L (L is a natural number) that is the number of data files that can be managed by the management file, the management file is provided so as to correspond to each directory on the recording medium, each of the management files includes management information of a data file in each corresponding directory, the file generating part records the plurality of the data files into the directories on the recording medium, the management information generating part adds the management information of the data file recorded in the directory into the management file that is provided so as to correspond to the directory, when the number of data files recorded into the directory reaches the maximum data file number L that is the number of data files that can be recorded in the directory when first to Nth (N is a natural number) data files among the plurality of the data files are recorded into the directory, the management file judging part changes the management file for storing the management information into another management file corresponding to another directory that is different from the directory, and the file generating part moves the first to Nth data files into the another directory and records (N+1)th and greater data files into the another directory.

18. A non-transitory recording medium storing a data recording program that allows a computer to execute processing for dividing continuous digital data into a plurality of data files and recording the plurality of the data files into a recording medium, the data recording program allowing the computer to execute:

file generating processing for dividing the continuous digital data so as to generate a plurality of the data files and recording the plurality of the data files sequentially into the recording medium;

management file judgment processing for determining one management file that stores the management information for managing the plurality of the data files; and management information generation processing for adding the management information including information showing a recording order of the plurality of the data files into the management file determined by the management file judgment processing, wherein the management file judgment processing is processing for determining a management file for storing the management information such that, when adding the management information of the plurality of the data files into the management file, the number of the data files managed by the management file does not exceed a maximum data file number L (L is a natural number) that is the number of data files that can be managed by the management file, the management file is provided so as to correspond to each directory on the recording medium, each of the management files includes management information of a data file in each corresponding directory, the file generating processing includes recording the plurality of the data files into the directories on the recording medium, the management information generating processing includes adding the management information of the data file recorded in the directory into the management file that is provided so as to correspond to the directory, when the number of data files recorded into the directory reaches the maximum data file number L that is the number of data files that can be recorded in the directory when first to Nth (N is a natural number) data files among the plurality of the data files are recorded into the directory, the management file for storing the management information in the management file judging processing is changed into another management file corresponding to another directory that is different from the directory, the first to Nth data files are moved into the another directory and (N+1)th and greater data files are recorded into the another directory in the file generating processing.

19. A data recording method in which a computer divides continuous digital data into a plurality of data files and records the plurality of the data files into a recording medium, the data recording method comprising:

a file generating step for dividing the continuous digital data so as to generate the plurality of the data files and recording the plurality of the data files sequentially into the recording medium;

a management file judging step for determining one management file for storing management information for managing the plurality of the data files; and a management information generating step for adding the management information including information that shows a recording order of the plurality of the data files into the management file determined in the management file judging step, wherein the management file judging step comprises determining the management file for storing the management information such that, when adding the management information of the plurality of the data files into the management file, the number of the data files managed by the management file does not exceed a maximum data file number L (L is a natural number) that is the number of data files that can be managed by the management file, the management file is provided so as to correspond to each directory on the recording medium, each of the management files includes management information of a data file in each corresponding directory, the file generating step comprising recording the plurality of the data files into the directories on the recording medium, the management information generating step comprising adding the management information of the data file recorded in the directory into the management file that is provided so as to correspond to the directory, when the number of data files recorded into the directory reaches the maximum data file number L that is the number of data files that can be recorded in the directory when first to Nth (N is a natural number) data files among the plurality of the data files are recorded into the directory, the management file for storing the management information in the management file judging step is changed into another management file corresponding to another directory that is different from the directory, and the first to Nth data files are moved into the another directory and (N+1)th and greater data files are recorded into the another directory in the file generating step.

* * * * *